(12) United States Patent
Okamoto et al.

(10) Patent No.: US 7,884,154 B2
(45) Date of Patent: Feb. 8, 2011

(54) RUBBER COMPOSITION

(75) Inventors: Naomi Okamoto, Ichihara (JP); Mitsuharu Anbe, Ichihara (JP)

(73) Assignee: UBE Industries, Ltd., Yamaguchi (JP)

( * ) Notice: Subject to any disclaimer, the term of this patent is extended or adjusted under 35 U.S.C. 154(b) by 475 days.

(21) Appl. No.: 10/596,755

(22) PCT Filed: Dec. 20, 2005

(86) PCT No.: PCT/JP2005/023379

§ 371 (c)(1), (2), (4) Date: Jun. 23, 2006

(87) PCT Pub. No.: WO2006/052035

PCT Pub. Date: May 18, 2006

(65) Prior Publication Data

US 2007/0155889 A1    Jul. 5, 2007

(30) Foreign Application Priority Data

| Dec. 21, 2004 | (JP) | 2004-369597 |
| Dec. 21, 2004 | (JP) | 2004-369643 |
| Dec. 21, 2004 | (JP) | 2004-369685 |
| Dec. 21, 2004 | (JP) | 2004-369707 |
| Dec. 21, 2004 | (JP) | 2004-369733 |
| Dec. 21, 2004 | (JP) | 2004-369771 |
| Dec. 21, 2004 | (JP) | 2004-369782 |

(51) Int. Cl.
*C08K 3/34* (2006.01)
*B60C 1/00* (2006.01)

(52) U.S. Cl. ...................... 524/493; 524/492

(58) Field of Classification Search .................. 524/493
See application file for complete search history.

(56) References Cited

U.S. PATENT DOCUMENTS

| 3,935,180 | A | 1/1976 | Sugiura et al. |
| 4,196,106 | A | 4/1980 | Matsuura et al. |
| 4,196,406 | A | 4/1980 | Salem |
| 4,379,889 | A | 4/1983 | Ashitaka et al. |
| 4,421,891 | A | 12/1983 | Miyake et al. |
| 4,476,287 | A | 10/1984 | Maehara et al. |
| 5,468,822 | A | 11/1995 | Tsujimoto et al. |
| 5,559,172 | A | 9/1996 | Kulich et al. |
| 5,580,919 | A | 12/1996 | Agostini et al. |
| 6,211,278 | B1 | 4/2001 | Vanel |
| 6,300,450 | B1 | 10/2001 | Tsujimoto et al. |
| 6,303,692 | B1 | 10/2001 | Luo |
| 6,350,807 | B1 * | 2/2002 | Blok et al. ......... 524/493 |
| 6,664,347 | B2 | 12/2003 | Suzuki et al. |
| 7,700,691 | B2 | 4/2010 | Asakura et al. |
| 2002/0170642 | A1 | 11/2002 | Westermann et al. |
| 2005/0070623 | A1 | 3/2005 | Takase et al. |
| 2008/0233399 | A1 | 9/2008 | Asakura et al. |

FOREIGN PATENT DOCUMENTS

| EP | 0645424 | A1 | 3/1995 |
| EP | 1693411 | A1 | 8/2006 |
| JP | 4917666 | A | 5/1974 |
| JP | 4917667 | A | 5/1974 |
| JP | 5345347 | A1 | 4/1978 |
| JP | 5531802 | A | 3/1980 |
| JP | 56109205 | A * | 8/1981 |
| JP | 57030856 | A | 7/1982 |
| JP | 61073707 | A | 4/1986 |
| JP | 62171 | B2 | 1/1987 |
| JP | 6336324 | B2 | 7/1988 |
| JP | 2037927 | B2 | 8/1990 |
| JP | 2038081 | B2 | 8/1990 |
| JP | 03045609 | A | 2/1991 |
| JP | 363566 | B2 | 10/1991 |

(Continued)

OTHER PUBLICATIONS

Translation of JP56109205, Aug. 1981.*
Translation of JP 2000044633, Feb. 2000.*
Malaysian Office Actin, Mar. 15, 2010.*
European Office Action, Mar. 11, 2010.*
Chinese Office Action, Jan. 29, 2010.*
Canadian Office Action, Jan. 25, 2010.*
Korean Office Action, Jan. 14, 2010.*
Translation of JP 05194658, Aug. 3, 1993.*
"Encyclopedia of Polymers", Sovietskaya entsiklopediya Publishers, vol. 1, pp. 1010, 1012, and 1014 (1972).

(Continued)

*Primary Examiner*—Ling-Siu Choi
*Assistant Examiner*—Hui Chin
(74) *Attorney, Agent, or Firm*—Panitch Schwarze Belisario & Nadel LLP

(57) ABSTRACT

The rubber composition of the invention includes a rubber composition which is a silica compounded rubber composition for tire containing 100 parts by weight of a rubber component made of (a) from 20 to 80% by weight of a vinyl-cis-polybutadiene rubber containing 1,2-polybutadiene having a melting point of 170° C. or higher and a high-molecular substance having at least one unsaturated double bond per a repeating unit and comprising at least one member selected from polyisoprene, crystalline polybutadiene having a melting point of not higher than 150° C., liquid polybutadiene and derivatives thereof and (b) from 80 to 20% by weight of a diene-based rubber other than (a); and (c) from 40 to 100 parts by weight of a rubber reinforcing agent containing 40% or more of silica, wherein the 1,2-polybutadiene is dispersed in a short crystalline fiber state and the high-molecular substance is dispersed in a granular state in the cis-polybutadiene rubber which is a matrix component of the subject vinyl-cis-polybutadiene rubber (a); and the short crystalline fiber of the 1,2-polybutadiene is dispersed in particles of the high-molecular substance.

13 Claims, 4 Drawing Sheets

FOREIGN PATENT DOCUMENTS

| | | | |
|---|---|---|---|
| JP | 04085304 A | | 3/1992 |
| JP | 05194658 A | | 8/1993 |
| JP | 6025355 A | | 2/1994 |
| JP | 06228370 A | | 8/1994 |
| JP | 7315014 A | | 12/1995 |
| JP | 8311246 | | 11/1996 |
| JP | 11240981 | | 9/1999 |
| JP | 2000044633 A | * | 2/2000 |
| JP | 2000-256507 A | | 9/2000 |
| JP | 2001-294614 A | | 10/2001 |
| JP | 2001-302730 A | | 10/2001 |
| JP | 2002338740 A | | 11/2002 |
| JP | 2003041064 A | | 2/2003 |
| JP | 200459740 A | | 2/2004 |
| JP | 2004-244427 A | | 9/2004 |
| JP | 2005-8817 A | | 1/2005 |
| JP | 2006-22243 A | | 1/2006 |
| JP | 2006-22244 A | | 1/2006 |
| JP | 2006-22245 A | | 1/2006 |
| JP | 2006-22247 A | | 1/2006 |
| JP | 2006-22248 A | | 1/2006 |
| JP | 2006-22246 A | | 6/2006 |
| KP | 199634289 A | | 10/1996 |
| KP | 2001111018 | | 12/2001 |
| RU | 2214427 C2 | | 10/2003 |
| TW | 442523 B | | 6/2001 |
| TW | 467942 B | | 12/2001 |
| TW | 475938 B | | 2/2002 |
| TW | 562817 B | | 11/2003 |
| WO | 03040231 A1 | | 5/2003 |
| WO | 2005056663 A1 | | 6/2005 |

OTHER PUBLICATIONS

Russian Office Action (with English Translation); May 28, 2009; Concerning Counterpart Russian Application No. 2007123019/04.

Chinese Office Action (with English translation) dated Jun. 5, 2009 concerning Chinese Application No. 200580043928.7.

"Khimicheskaya Entsiclopediya (Chemical Encyclopaedia - in Russian)"; Bolshaya Rossiyskaya Entsiclopediya Scientific Publishers; Moscow; vol. 4; pp. 183-184; (1995).

Chinese Office Action (with English translation) dated Nov. 6, 2009 concerning Chinese Application No. 200580043921.5.

Chinese Office Action dated Nov. 6, 2009 concerning Chinese Application No. 200580043921.5.

Book excerpt regarding rubber material characteristics, pp. 17-19 (2003).

Excerpt from Rubber Material Performance and Design Application, Section 4 Polybutadiene Rubber, pp. 17-19 (2003) (with English abstract).

Office Action issued May 24, 2010 in related U.S. Appl. No. 12/714,964.

Chinese Office Action issued May 12, 2010 (with English translation).

Canadian Office Action dated May 21, 2010 in Canadian Application No. 2,591,712.

Mexican Office Action (with English translation) issued Jun. 14, 2010 in Mexican Patent Application No. MX/a/2007/007522.

Chinese Office Action (with English translation) issued Jul. 5, 2010 in Chinese Patent Application No. 200580043928.7.

U.S. Office Action issued Jun. 22, 2010 in U.S. Appl. No. 10/596,757.

Indian office Action issued Jun. 16, 2010 in Indian Application No. 3100/DELNP/2006.

European Office Action issued Aug. 31, 2010 in European Patent Application No. 05 820 043.7-1214.

EP Office Action issued Sep. 20, 2010 from the European Patent Office in European Application No. 05 820 040.3.

* cited by examiner

RUBBER COMPOSITION

CROSS-REFERENCE TO RELATED APPLICATION

This application is a section 371 of International Application No. PCT/JP2005/023379, filed Dec. 20, 2005, which was published in the Japanese language on May 18, 2006, under International Publication No. WO 2006/052035 A1 and the disclosure of which is incorporated herein by reference.

TECHNICAL FIELD

The present invention relates to a silica compounded rubber composition suitable for tire cap treads, which has a small die swell and excellent extrusion processability while keeping excellent wet skid performance, exothermic characteristic and abrasion resistance as required for the performance of tires such as safety and economy.

Also, the invention relates to a rubber composition for sidewalls made of novel vinyl-cis-polybutadiene, which has a small die swell and excellent extrusion processability and which is capable of improving low fuel consumption with respect to a vulcanizate thereof.

Also, the invention relates to a tire for passenger automobile using, as a cap tread rubber, a rubber composition having a small die swell and excellent extrusion processability while keeping a high elastic modulus.

Also, an object of the invention relates to a rubber composition for large-sized vehicle using, as a cap tread rubber, a rubber composition having a small die swell and excellent extrusion processability while keeping a high elastic modulus.

Also, the invention relates to a high-hardness compounded rubber composition and more specifically, to a rubber composition suitable for beads and chafers of tire, which has improved dimensional stability (die swell is small) at the time of extrusion processing or durability while keeping a high hardness.

Also, the invention relates to a rubber composition for base treads and more specifically, to a rubber composition for base treads made of novel vinyl-cis-polybutadiene capable of making both internal exothermic characteristics of a tire and extrusion processability compatible with each other in a good balance.

Also, the invention relates to a rubber composition for internal members of tire such as tire coating rubbers inclusive of carcasses and belts, which has a small die swell, excellent extrusion processability and satisfactory adhesiveness to metals.

The rubber composition of the invention can be used for tire members such as tire sidewalls, cap treads, side reinforcing layers of run flat tire, carcasses, belts, chafers, base treads, beads, stiffners, and inner liners; industrial products such as rubber vibration insulators, hoses, belts, rubber rolls, rubber coolers, and shoe sole rubbers; and other composites, adhesives, plastic modifiers, and so on.

BACKGROUND ART

Polybutadiene has a so-called microstructure in which a binding segment formed by polymerization at the 1,4-positions (1,4-structure) and a binding segment formed by polymerization at the 1,2-positions (1,2-structure) are copresent in the molecular chain. The 1,4-structure is further classified into a cis-structure and a trans-structure. On the other hand, the 1,2-strucutre takes a structure containing a vinyl group as a side chain.

Hitherto, a production process of a vinyl-cis-polybutadiene rubber composition has been carried out in an aromatic hydrocarbon-based solvent such as benzene, toluene, and xylene. When such a solvent is used, since the viscosity of a polymerization solution is high, there were problems in stirring, heat transfer, delivery, and so on, and excessive energy was required for recovering the solvent.

As the foregoing production process, there is known a process in which 1,3-butadiene is subjected to cis-1,4-polymerization in the foregoing inert organic solvent by using a catalyst obtainable from water, a soluble cobalt compound and an organoaluminum halide represented by the general formula, $AlR_nX_{3-n}$ (wherein R represents an alkyl group having from 1 to 6 carbon atoms, a phenyl group, or a cycloalkyl group; X represents a halogen atom; and n represents a numeral of from 1.5 to 2) to produce BR, and 1,3-butadiene is then subjected to syndiotactic 1,2-polymerization (hereinafter abbreviated as "1,2-polymerization") in the presence of a catalyst obtainable from a soluble cobalt compound, an organoaluminum compound represented by the general formula, $AlR_3$ (wherein R represents an alkyl group having from 1 to 6 carbon atoms, a phenyl group or a cycloalkyl group) and carbon disulfide by adding or not adding 1,3-butadiene and/or the foregoing solvent to this polymerization system (see, for example, JP-B-49-17666 (Patent Document 1) and JP-B-49-17667 (Patent Document 2)).

Furthermore, for example, JP-B-62-171 (Patent Document 3), JP-B-63-36324 (Patent Document 4), JP-B-2-37927 (Patent Document 5), JP-B-2-38081 (Patent Document 6) and JP-B-3-63566 (Patent Document 7) describe a process in which the production is carried out by subjecting 1,3-butadiene to cis-1,4-polymerization in the presence or absence of carbon disulfide, or after the production, 1,3-butadiene and carbon disulfide are separated and recovered, thereby circulating 1,3-butadiene not substantially containing carbon disulfide or the foregoing inert organic solvent. In addition, JP-B-4-48815 (Patent Document 8) describes a rubber composition having excellent tensile stress and flex crack growth resistance, in which a compounded material thereof has a small die swell ratio and a vulcanizate thereof is suitable as a sidewall of tire.

Furthermore, JP-A-2000-44633 (Patent Document 9) describes a process in which the production is carried out in an inert organic solvent containing, as the major component, a C4 fraction such as n-butane, cis-2-butene, trans-2-butene, and butene-1. It is described that in this process, 1,2-polybutadiene contained in the rubber composition is a short fiber crystal, and the distribution of the major axis length of the short fiber crystal is such that 98% or more of the fiber length is less than 0.6 μm and 70% or more thereof is less than 0.2 μm. Also, it is described that in the resulting rubber composition, the moldability, tensile stress, tensile strength and flex crack growth resistance of a cis-1,4-polybutadiene rubber (hereinafter abbreviated as "BR") are improved. However, rubber compositions in which various characteristics are improved were demanded depending upon the utility.

Patent Document 1: JP-B-49-17666
Patent Document 2: JP-B-49-17667
Patent Document 3: JP-B-62-171
Patent Document 4: JP-B-63-36324
Patent Document 5: JP-B-2-37927
Patent Document 6: JP-B-2-38081
Patent Document 7: JP-B-3-63566
Patent Document 8: JP-B-4-48815
Patent Document 9: JP-A-2000-44633

In general, with respect to the performance of automobile tire, there are required excellent wet skid properties as a braking characteristic and excellent rolling resistance (tan δ) or abrasion resistance as a fuel consumption characteristic. However, it is known that these characteristics are in an antinomy relation with each other. In recent years, though there has been made a proposal to compound silica having excellent wet skid properties, thereby highly balancing the foregoing characteristics, such is not satisfactory yet. It is known that though the silica compounding is excellent in the wet skid properties and fuel consumption properties, the abrasion resistance and processability are lowered. While the abrasion resistance is improved by the use of high cis-BR, there is some possibility that the wet skid properties are lowered, and therefore, improvements were demanded.

Furthermore, in general, it is known that a proportion of the tire rolling resistance occupying in the running resistance which largely affects the fuel consumption of an automobile is large and that the affect due to an energy loss of sidewall rubber is relatively large. For that reason, rubbers having a low dissipation factor such as natural rubbers, isoprene rubbers, butadiene rubbers, and mixtures thereof have hitherto been used in the sidewall part. However, it is required that the rolling resistance of tire is further improved.

As a method for reducing the dissipation factor of the sidewall rubber, the use of carbon black having low reinforcing properties or a reduction of the compounding amount of carbon black may be thought. However, there is encountered such a problem that the die swell at the time of extrusion processing becomes large, and therefore, it is difficult to make the thickness of the sidewall member thin or to realize an enhancement of uniformity of tire. For that reason, there is demanded a method for realizing low fuel consumption while keeping a small die swell with respect to an extrudate thereof.

Furthermore, in general, tires are required to have excellent drivability and durability and so on. In particular, from the standpoint of safety, the tires are required to have excellent wet skid resistance on a wet road surface. Moreover, on the basis of social requirements for realizing conservation of natural resources in recent years, tires having a low rolling resistance, namely tires with a low energy loss, are being researched and developed. While the energy loss of tire as consumed by free rotation varies depending upon the tire structure, etc., about a half of the whole energy is consumed in the tread part. Accordingly, if the energy loss of the tread rubber is reduced, a tire with a low energy loss at the time of rolling is obtained.

Then, it is attempted to modify the tread rubber such that the energy loss is low. However, such modification of the rubber tends to lower the wet skid properties. Since an improvement of the rolling resistance and an improvement of the wet skid properties generally contradict to each other, various designs for the improvements in the tire structure are attempted in order to make them compatible with each other. As one of the designs, there is enumerated a method for forming a tread into two layers consisting of a cap tread and a base tread. That is, this method is to form the tread into two layers of a cap tread with excellent wet skid properties and a base tread with a low energy loss, thereby not only enhancing the wet skid properties of tire as a whole but also lowering the energy loss.

The rubber for cap tread is required to have a high elastic modulus and molding stability derived from the abrasion resistance and high-speed running properties in addition to the wet skid properties. As a method for obtaining a rubber with a high elastic modulus, various methods have hitherto been attempted. The method for compounding a large amount of carbon black is not preferable because unification of rubbers is poor in the processing step, an electrical power load increases at the time of kneading or extrusion, and ML of the compounded material becomes large, whereby difficulty is accompanied at the time of extrusion molding. The method for compounding a large amount of sulfur involves such defects that sulfur causes blooming and that the crack growth becomes fast due to an increase of the degree of crosslinking. With respect to the addition of a thermosetting resin, since the thermosetting resin is low in compatibility with usually used natural rubbers or diene-based rubbers, when a large amount of the thermosetting resin is compounded, satisfactory dispersion is hardly obtained. Furthermore, since this mixed compound is hard even in an unvulcanized state, the load may become large in kneading or extrusion, or the molding processability of tire may be deteriorated. In a method for merely blending and compounding single fibers, since binding between short fibers and the rubber is insufficient, creep may become large, or fatigue life may be lowered.

As the rubber for base tread, a rubber with low exothermic characteristics is required. Examples of rubbers with low exothermic characteristics include natural rubbers, isoprene rubbers, and cis-1,4-polybutadiene rubbers, and compounded materials of such a rubber with carbon black are used. In order to reveal low exothermic characteristics by other materials than rubbers, it may be thought to use carbon black having a large particle size and low reinforcing properties or to lower the compounding amount of carbon black. However, these methods involve such problems that the elastic modulus or fatigue resistance of rubber is lowered and that the die swell becomes large. Furthermore, there is a method for revealing low exothermic characteristics by compounding short fibers of nylon or vinylon, thereby making the rubber have a high elastic modulus. However, since these short fibers are insufficient in adhesion to rubbers, there is encountered a problem that the fatigue life is short.

On the other hand, when a cap/base system is employed in passenger automobile tires, at the time of co-extrusion of a cap tread and a base tread, there is caused a problem that an extrudate is warped because of a difference in die swell between the both members. If the die swell of the base tread rubber is made small, this problem is liable to be solved. If a large amount of carbon black with high reinforcing properties is compounded, though the die swell become small, the heat generation becomes large. Thus, a method which is satisfied with the die swell and low heat generation at the same time is desired.

Furthermore, as rubber members to be disposed in the surroundings of tire bead, high-hardness rubbers are used. Examples thereof include a rubber composition having an increased compounding amount of carbon black and a rubber composition having a novolak-type phenol resin compounded therein (see JP-B-57-30856) and a rubber composition having short fibers and an olefin-based resin compounded therein (see JP-A-7-315014).

With respect to a method for obtaining a high-hardness rubber composition, it is general to increase carbon black or to compound a fiber, a resin, etc. However, in all of these methods, there may be the case where the heat generation at the time of repeated deformation becomes large, whereby the durability and fatigue resistance are lowered. Thus, improvements are required.

Furthermore, in general, in radial tires, a steel cord is used in view of high-speed durability and high-speed drivability. In the case of using a steel cord, a very large strain is liable to be gathered in a rubber in the vicinity of the steel cord at the time of running of tire. Accordingly, the rubber for steel cord is required to have a high elastic modulus and excellent adhesiveness to metals. Even in radial tires or bias tires using an organic fiber cord, rubbers having a high elastic modulus are preferable as the rubber for cord from the viewpoint of durability.

As a method for obtaining a rubber with a high elastic modulus, various methods have hitherto been attempted. The method for compounding a large amount of carbon black is not preferable because unification of rubbers is poor in the processing step, an electrical power load increases at the time of kneading or extrusion, and ML of the compounded material becomes large, whereby difficulty is accompanied at the time of extrusion molding. The method for compounding a large amount of sulfur involves such defects that sulfur causes blooming and that the crack growth becomes fast due to an increase of the degree of crosslinking. With respect to the addition of a thermosetting resin, since the thermosetting resin is low in compatibility with natural rubbers or diene-based rubbers as usually used as a cord coating rubber, dispersion failure likely occurs, and crack resistance is deteriorated. Furthermore, conventionally known rubber compositions for tire cord coating are small in green strength. Thus, materials having a large green strength are required in view of molding processability.

DISCLOSURE OF THE INVENTION

Problems that the Invention is to Solve

An object of the invention is to obtain a silica compounded rubber composition for tire having excellent extrusion processability and having satisfactory wet skid properties and abrasion resistance while keeping a high elastic modulus.

Also, an object of the invention is to obtain a rubber composition for sidewall having low fuel consumption with respect to a vulcanizate thereof and having a small die swell.

Also, an object of the invention is to obtain a tire for passenger automobile having excellent extrusion molding processability and having good high-speed running properties, grip properties on a wet road surface and abrasion resistance by using a rubber composition for cap tread having excellent extrusion processability while keeping a high elastic modulus.

Also, an object of the invention is to obtain a rubber composition for large-sized vehicle having excellent moldability and having good high-speed running properties, wet skid properties and abrasion resistance by using a rubber composition for cap tread having a small die swell and excellent extrusion processability while keeping a high elastic modulus.

Also, an object of the invention is to provide a rubber composition capable of improving dimensional stability at the time of extrusion processing and durability with respect to a tire thereof while keeping a high hardness.

Also, an object of the invention is to obtain a rubber composition for base tread having low exothermic characteristics with respect to a vulcanizate thereof and having a small die swell.

Also, an object of the invention is to obtain a rubber composition for tire cord coating of carcasses, belts, beads, etc. having a small die swell, a large green strength and excellent molding processability and having a large elastic modulus with respect to a vulcanizate thereof.

Means for Solving the Problems (1) The invention is concerned with a rubber composition which is a silica compounded rubber composition for tire comprising 100 parts by weight of a rubber component made of (a) from 20 to 80% by weight of a vinyl-cis-polybutadiene rubber containing 1,2-polybutadiene having a melting point of 170° C. or higher and a high-molecular substance having at least one unsaturated double bond per a repeating unit and comprising at least one member selected from polyisoprene, crystalline polybutadiene having a melting point of not higher than 150° C., liquid polybutadiene and derivatives thereof and (b) from 80 to 20% by weight of a diene-based rubber other than (a); and (c) from 40 to 100 parts by weight of a rubber reinforcing agent containing 40% or more of silica, which is characterized in that the 1,2-polybutadiene is dispersed in a short crystalline fiber state and the high-molecular substance is dispersed in a granular state in the cis-polybutadiene rubber which is a matrix component of the subject vinyl-cis-polybutadiene rubber (a); and that the short crystalline fiber of the 1,2-polybutadiene is dispersed in particles of the high-molecular substance.

(2) Also, the invention is concerned with a rubber composition which is a rubber composition for sidewall comprising 100 parts by weight of a rubber component made of (a) from 20 to 80% by weight of a vinyl-cis-polybutadiene rubber containing 1,2-polybutadiene having a melting point of 170° C. or higher and a high-molecular substance having at least one unsaturated double bond per a repeating unit and comprising at least one member selected from polyisoprene, crystalline polybutadiene having a melting point of not higher than 150° C., liquid polybutadiene and derivatives thereof and (b) from 80 to 20% by weight of a diene-based rubber other than (a); and (c) from 25 to 60 parts by weight of a rubber reinforcing agent, which is characterized in that the 1,2-polybutadiene is dispersed in a short crystalline fiber state and the high-molecular substance is dispersed in a granular state in the cis-polybutadiene rubber which is a matrix component of the subject vinyl-cis-polybutadiene rubber (a); and that the short crystalline fiber of the 1,2-polybutadiene is dispersed in particles of the high-molecular substance.

(3) Also, the invention is concerned with a rubber composition which is a rubber composition for passenger automobile tire comprising 100 parts by weight of a rubber component made of (a) from 10 to 50% by weight of a vinyl-cis-polybutadiene rubber containing 1,2-polybutadiene having a melting point of 170° C. or higher and a high-molecular substance having at least one unsaturated double bond per a repeating unit and comprising at least one member selected from polyisoprene, crystalline polybutadiene having a melting point of not higher than 150° C., liquid polybutadiene and derivatives thereof, (e) from 30 to 70% by weight of a styrene-butadiene rubber, and (b) from 0 to 60% by weight of a diene-based rubber other than (a) and (e); and (d) from 40 to 100 parts by weight of a rubber reinforcing agent, which is characterized in that the 1,2-polybutadiene is dispersed in a short crystalline fiber state and the high-molecular substance is dispersed in a granular state in the cis-polybutadiene rubber which is a matrix component of the subject vinyl-cis-polybutadiene rubber (a); and that the short crystalline fiber of the 1,2-polybutadiene is dispersed in particles of the high-molecular substance.

(4) Also, the invention is concerned with a rubber composition which is a rubber composition for large-sized vehicle tire comprising 100 parts by weight of a rubber component made of (a) from 10 to 60% by weight of a vinyl-cis-polybutadiene rubber containing 1,2-polybutadiene having a melting point of 170° C. or higher and a high-molecular substance having at least one unsaturated double bond per a repeating unit and comprising at least one member selected from polyisoprene, crystalline polybutadiene having a melting point of not higher than 150° C., liquid polybutadiene and derivatives thereof and (b) from 90 to 40% by weight of a diene-based rubber other than (a); and (c) from 45 to 70 parts by weight of a rubber reinforcing agent, which is characterized in that the 1,2-polybutadiene is dispersed in a short crystalline fiber state and the high-molecular substance is dispersed in a granular state in the cis-polybutadiene rubber which is a matrix component of the subject vinyl-cis-polybutadiene rubber (a); and that the short crystalline fiber of the 1,2-polybutadiene is dispersed in particles of the high-molecular substance.

(5) Also, the invention is concerned with a rubber composition which is a high-hardness compounded rubber composition comprising 100 parts by weight of a rubber component made of (a) from 20 to 80% by weight of a vinyl-cis-polybutadiene rubber containing 1,2-polybutadiene having a melting point of 170° C. or higher and a high-molecular substance having at least one unsaturated double bond per a repeating unit and comprising at least one member selected from polyisoprene, crystalline polybutadiene having a melting point of not higher than 150° C., liquid polybutadiene and derivatives thereof and (b) from 80 to 20% by weight of a diene-based rubber other than (a); and (c) from 60 to 100 parts by weight of a rubber reinforcing agent, which is characterized in that the 1,2-polybutadiene is dispersed in a short crystalline fiber state and the high-molecular substance is dispersed in a granular state in the cis-polybutadiene rubber which is a matrix component of the subject vinyl-cis-polybutadiene rubber (a); and that the short crystalline fiber of the 1,2-polybutadiene is dispersed in particles of the high-molecular substance.

(6) Also, the invention is concerned with a rubber composition which is a rubber composition for base tread comprising 100 parts by weight of a rubber component made of (a) from 20 to 80% by weight of a vinyl-cis-polybutadiene rubber containing 1,2-polybutadiene having a melting point of 170° C. or higher and a high-molecular substance having at least one unsaturated double bond per a repeating unit and comprising at least one member selected from polyisoprene, crystalline polybutadiene having a melting point of not higher than 150° C., liquid polybutadiene and derivatives thereof and (b) from 80 to 20% by weight of a diene-based rubber other than (a); and (c) from 22 to 55 parts by weight of a rubber reinforcing agent, which is characterized in that the 1,2-polybutadiene is dispersed in a short crystalline fiber state and the high-molecular substance is dispersed in a granular state in the cis-polybutadiene rubber which is a matrix component of the subject vinyl-cis-polybutadiene rubber (a); and that the short crystalline fiber of the 1,2-polybutadiene is dispersed in particles of the high-molecular substance.

(7) Also, the invention is concerned with a rubber composition which is a rubber composition for tire cord coating comprising 100 parts by weight of a rubber component made of (a) from 10 to 60% by weight of a vinyl-cis-polybutadiene rubber containing 1,2-polybutadiene having a melting point of 170° C. or higher and a high-molecular substance having at least one unsaturated double bond per a repeating unit and comprising at least one member selected from polyisoprene, crystalline polybutadiene having a melting point of not higher than 150° C., liquid polybutadiene and derivatives thereof and (b) from 90 to 40% by weight of a diene-based rubber other than (a); and (c) from 30 to 80 parts by weight of a rubber reinforcing agent, which is characterized in that the 1,2-polybutadiene is dispersed in a short crystalline fiber state and the high-molecular substance is dispersed in a granular state in the cis-polybutadiene rubber which is a matrix component of the subject vinyl-cis-polybutadiene rubber (a); and that the short crystalline fiber of the 1,2-polybutadiene is dispersed in particles of the high-molecular substance.

(8) The invention is concerned with the rubber composition as set forth above in any one of (1) to (7), which is characterized in that the subject vinyl-cis-polybutadiene rubber (a) is produced by a process for producing a vinyl-cis-polybutadiene rubber by subjecting 1,3-butadiene to cis-1,4-polymerization in a hydrocarbon-based solvent by using a cis-1,4-polymerization catalyst, subsequently making a 1,2-polymerization catalyst copresent in the resulting polymerization reaction mixture to subject the 1,3-butadiene to 1,2-polymerization, thereby forming 1,2-polybutadiene having a melting point of 170° C. or higher, and then separating, recovering and obtaining a vinyl-cis-polybutadiene rubber as formed from the resulting polymerization reaction mixture, which is characterizing by including a step for adding a high-molecular substance having at least one unsaturated double bond per a repeating unit within the production system of the vinyl-cis-polybutadiene rubber.

(9) Also, the invention is concerned with the rubber composition as set forth above in any one of (1) to (8), which is characterized in that in the production step of the vinyl-cis-polybutadiene rubber (a), the unsaturated high-molecular substance is contained in the range of from 0.01 to 50% by mass based on the total sum of the crystalline fiber of 1,2-polybutadiene and the cis-polybutadiene rubber.

(10) Also, the invention is concerned with the rubber composition as set forth above in any one of (1) to (9), which is characterized in that the short fiber of 1,2-polybutadiene in the subject vinyl-cis-polybutadiene rubber (a) is also dispersed in the cis-polybutadiene rubber as the matrix component without being contained in the particles of the high-molecular substance; that the major axis length of the short crystalline fiber dispersed in the subject matrix is in the range of from 0.2 to 1,000 µm; and that the major axis length of the short crystalline fiber of the 1, 2-polybutadiene dispersed in the particles of the subject high-molecular substance is in the range of from 0.01 to 0.5 µm.

(11) Also, the invention is concerned with the rubber composition as set forth above in any one of (1) to (10), which is characterized that the subject vinyl-cis-polybutadiene rubber (a) has the following characteristics:

(1) the cis-polybutadiene rubber which is the matrix component of the subject vinyl-cis-polybutadiene rubber has a Mooney viscosity in the range of from 10 to 50;

(2) the cis-polybutadiene rubber which is the matrix component of the subject vinyl-cis-polybutadiene rubber has a viscosity in a toluene solution at 25° C. in the range of from 10 to 150;

(3) the cis-polybutadiene rubber which is the matrix component of the subject vinyl-cis-polybutadiene rubber has an [η] in the range of from 1.0 to 5.0;

(4) the cis-polybutadiene rubber which is the matrix component of the subject vinyl-cis-polybutadiene rubber has a 1,4-cis-structure content in the range of 80% ore more;

(5) the 1,2-polybutadiene and the high-molecular substance are dispersed in a physically and/or chemically adsorbed state in the cis-polybutadiene rubber which is the matrix component of the subject vinyl-cis-polybutadiene rubber; and (6) the high-molecular substance in the subject vinyl-cis-polybutadiene rubber is a boiling n-hexane insoluble matter.

(12) Also, the invention is concerned with the rubber composition as set forth above in (1), which is characterized that the diene-based rubber (b) other than (a) is a natural rubber and/or polyisoprene and/or a styrene-butadiene rubber.

(13) Also, the invention is concerned with the rubber composition as set forth above in any one of (2) to (7), which is characterized that the diene-based rubber (b) other than (a) is a natural rubber and/or polyisoprene.

(14) Also, the invention is concerned with the rubber composition as set forth above in any one of (2) to (7), which is characterized that the rubber reinforcing agent is carbon black.

Advantages of the Invention

The silica compounded rubber composition for tire which is used in the invention has a small die swell and excellent extrusion processability and moldability while keeping high wet skid properties, improves the workability of tire manufacture and has excellent abrasion resistance and low fuel consumption.

The rubber composition for sidewall of the invention has low fuel consumption with respective to a vulcanizate thereof and has a small die swell.

The rubber composition for passenger automobile tire according to the invention is able to realize a high elastic modulus and high abrasion resistance while keeping wet skid properties.

The rubber composition for large-sized vehicle tire according to the invention has a small die swell and excellent extrusion processability while keeping a high elastic modulus and is able to be highly balanced between wet skid properties and abrasion resistance.

The high-hardness compounded rubber composition according to the invention improves dimensional stability at the time of processing and durability of tire at the same time while keeping a high hardness and is able to make the both performances compatible with each in a good balance.

The rubber composition for base tread according to the invention improves die swell and low fuel consumption at the same time and is able to make the both performances compatible with each in a good balance.

The rubber composition for tire cord coating according to the invention has a small die swell, large green strength and excellent extrusion processability and moldability while keeping a high elastic modulus, has excellent adhesiveness to metals and is able to be highly balanced among the respective characteristics.

BEST MODES FOR CARRYING OUT THE INVENTION

Figure 1:
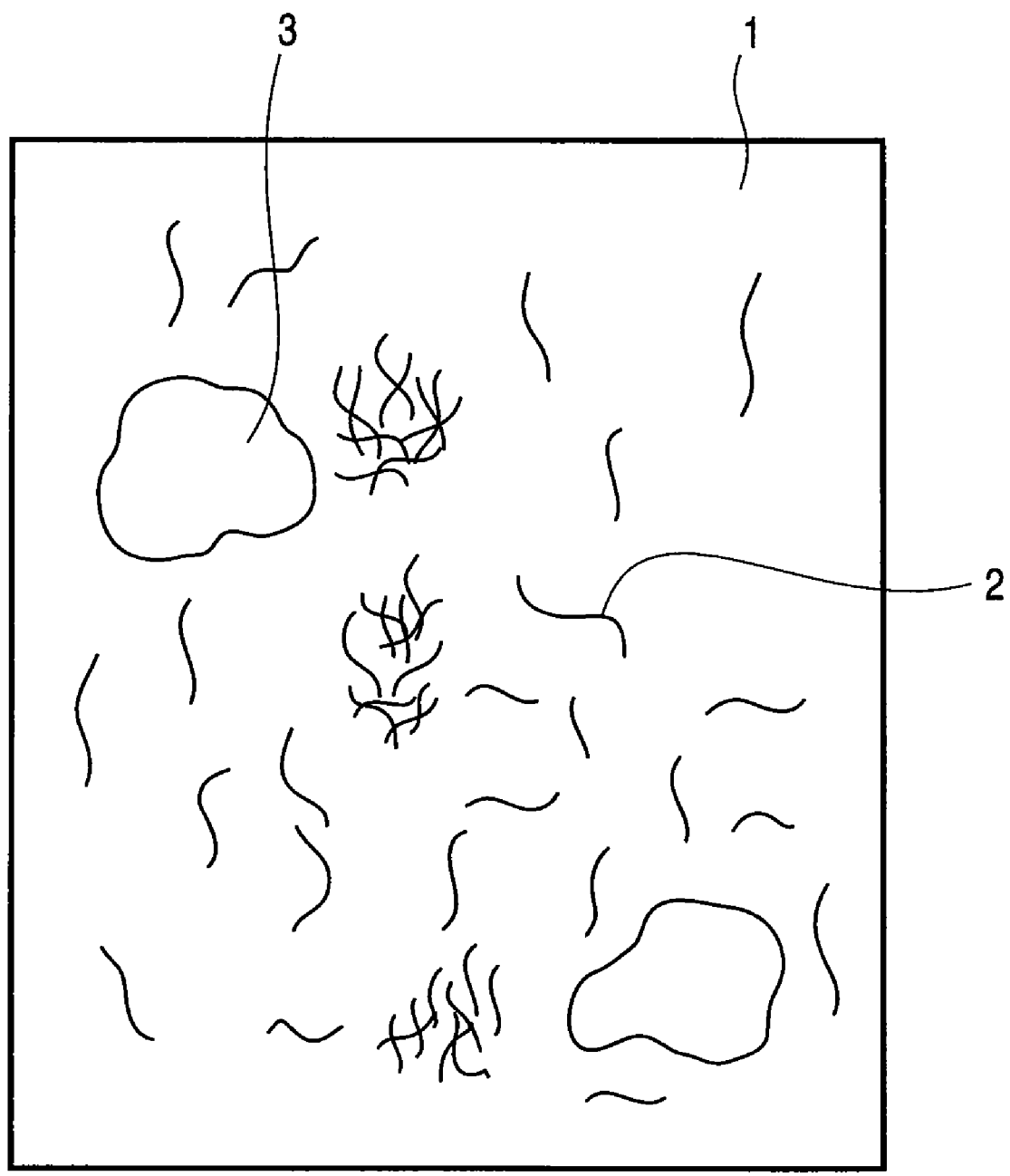
[FIG. 1] shows an embodiment in which a crystalline fiber 2 of 1,2-polybutadiene having a melting point of 170° C. or higher and a fine particle 3 of an unsaturated high-molecular substance are individually dispersed in a matrix 1.

In general, the vinyl-cis-polybutadiene rubber (a) of the invention is constructed as follows. That is, it is composed of (1) from 1 to 50 parts by mass of 1,2-polybutadiene having a melting point of 170° C. or higher, (2) 100 parts by mass of a cis-polybutadiene rubber, and (3) from 0.01 to 50% by mass, based on the whole amount of the foregoing (1) and (2), of an unsaturated high-molecular substance. Furthermore, the 1,2-polybutadiene having a melting point of 170° C. or higher which is the component (1) forms a crystalline fiber in a short fiber state in which a minor axis length of average monodispersed fiber crystals is not more than 0.2 μm, an aspect ratio is not more than 10,and the number of average monodispersed fiber crystals is 10 or more.

It is desired that the crystalline fiber of 1,2-polybutadiene which is the foregoing component (1) is in a short fiber state in which a minor axis length of average monodispersed fiber crystals is not more than 0.2 μm, and preferably not more than 0.1 μm, an aspect ratio is not more than 10,and preferably not more than 8,and the number of average monodispersed fiber crystals is 10 or more, and preferably 15 or more, and has a melting point of 170° C. or higher, and preferably from 190 to 220° C.

Then, in the vinyl-cis-polybutadiene rubber (a) of the invention, the 1, 2-polybutadiene having a melting point of 170° C. or higher which is the foregoing component (1) is present in a short crystalline fiber state and the unsaturated high-molecular substance which is the foregoing component (3) is present in a granular state in the cis-polybutadiene which is the foregoing component (2) as a matrix component. Furthermore, the particle of the unsaturated high-molecular substance as dispersed in the cis-polybutadiene which is the foregoing component (2) as a matrix component has a major axis size in the range of from 0.2 to 1,000 μm, and the short crystalline fiber of the 1,2-polybutadiene as dispersed in the particles of the subject high-molecular substance has a major axis length in the range of from 0.01 to 0.5 μm.

It is desired that the cis-polybutadiene rubber which is the foregoing component (2) has the following characteristic. That is, the Mooney viscosity ($ML_{1+4}$ at 100° C., hereinafter abbreviated as "ML") is preferably from 10 to 50,and more preferably from 10 to 40.In this way, there are brought such effects that the workability at the time of compounding is improved and the dispersibility of the foregoing component (1) into the component (2) is improved. Furthermore, it is desired that the cis-polybutadiene rubber which is the component (2) has the following characteristics. That is, it is desired that the viscosity in a toluene solution (centipoises at 25° C., hereinafter abbreviated as "T-cp") is preferably from 10 to 150, and more preferably from 10 to 100; and that [η] (inherent viscosity) is from 1.0 to 5.0,and preferably from 1.0 to 4.0. Furthermore, it is desired that 1,4-cis-structure content is 80% or more, and preferably 90% or more; and that a gel matter is not substantially contained. Here, what a gel matter is not substantially contained means that a toluene insoluble matter is not more than 0.5% by mass.

The "toluene insoluble matter" as referred to herein means a gel matter as attached to a 200-mesh wire net after charging 10 g of a sample rubber and 400 mL of toluene in an Erlenmeyer flask, completely dissolving at RT (25° C.) and then filtering the solution by using a filter on which the wire net is placed. The foregoing proportion refers to a value as defined in terms of percentage to the sample rubber, which is obtained by drying in vacuo the wire net having a gel attached thereonto and measuring the attachment amount.

Furthermore, the [η] (inherent viscosity) is a value [η] as determined according to the following expressions after charging 0.1 g of a sample rubber and 100 mL of toluene in an Erlenmeyer flask, completely dissolving at 30° C., charging 10 mL of the solution in a Cannon-Fenske dynamic viscometer in a constant-temperature water tank controlled at 30° C. and measuring a drop time (T) of the solution.

$\eta sp = T/T_0 - 1$ ($T_0$: drop time of only toluene)

$\eta sp/c = [\eta] + k'[\eta]^2 c$ (ηsp: specific viscosity, k': Huggins' constant (0.37), c: sample concentration (g/mL))

It is desired that with respect to the proportion of the 1,2-polybutadiene crystalline fiber which is the foregoing component (1) to the cis-polybutadiene rubber which is the component (2), the proportion of the 1,2-polybutadiene crystalline fiber which is the foregoing component (1) is from 1 to 50 parts by mass, and preferably from 1 to 30 parts by mass based on 100 parts by mass of the cis-polybutadiene rubber which is the component (2) as described previously. When the proportion falls within the foregoing range, it is possible to avoid such inconveniences that in the case where the proportion is large as more than 50 parts by mass, the short fiber crystal of the 1,2-polybutadiene crystalline fiber in the cis-polybutadiene rubber is liable to become large to have poor dispersibility and that in the case where the proportion is small as less than 1 part by mass, the reinforcing properties due to the short fiber crystal are lowered. Accordingly, the problems that the elastic modulus, extrusion processability, moldability and the like as the characteristic features are hardly revealed and that the processability is deteriorated are hardly caused, and therefore, such is preferable. Furthermore, it is desired that the proportion of the unsaturated high-molecular substance which is the component (3) is from 0.01 to 50% by mass, and preferably from 0.01 to 30% by mass based on the vinyl-cis-polybutadiene rubber as described previously. What the proportion falls within the foregoing range is preferable in view of an improvement of the dispersibility due to coagulation of the 1,2-polybutadiene crystalline fiber which is the foregoing component (1) and inhibition in lowering of accompanied various physical properties which are derived from the vinyl-cis-polybutadiene rubber, and so on.

For example, the foregoing vinyl-cis-polybutadiene rubber is suitably obtained by the following production process.

In general, in the production of the vinyl-cis-polybutadiene rubber of the invention, the polymerization of 1,3-butadiene is carried out by using a hydrocarbon-based solvent. As this hydrocarbon-based solvent, a hydrocarbon-based solvent having a solubility parameter (hereinafter abbreviated as "SP value") of not more than 9.0 is preferable, and a hydrocarbon-based solvent having a solubility parameter of not more than 8.4 is more preferable. Examples of the hydrocarbon-based solvent having a solubility parameter of not more than 9.0 include aliphatic hydrocarbons and alicyclic hydrocarbons such as n-hexane (SP value: 7.2), n-pentane (SP value: 7.0), n-octane (SP value: 7.5), cyclohexane (SP value: 8.1), and n-butane (SP value: 6.6). Of these, cyclohexane or the like is preferable.

The SP values of these solvents are known by documents such as *Rubber Industry Handbook* (Fourth Edition, The Society of Rubber Industry, Japan, issued Jan. 20, 1994, page 721).

By using a solvent having an SP value of not more than 9.0, the dispersion state of the short fiber crystal of the 1,2-polybutadiene crystalline fiber into the cis-polybutadiene rubber is formed as expected in the invention and an excellent die swell characteristic and high elastic modulus and tensile strength are revealed, and therefore, such is preferable.

First of all, 1,3-butadiene and the foregoing solvent are mixed, and the water content in the resulting solution is then adjusted. The water content is preferably in the range of from 0.1 to 1.0 mole, and especially preferably from 0.2 to 1.0 mole per mole of the organoaluminum chloride used as the after-mentioned cis-1,4-polymerization catalyst in the foregoing solution. What the water content falls within this range is preferable because the sufficient catalytic activity can be obtained; the preferable content of the cis-1,4-structure and the molecular weight can be obtained; the formation of a gel at the time of polymerization can be inhibited so that attachment of the gel to a polymerization tank or the like can be prevented; and in addition, the continuous polymerization time can be prolonged. As a method for adjusting the water content, known methods can be applied. A method for undergoing addition and dispersion by passing through a porous filtering material (see JP-A-4-85304) is also effective.

An organoaluminum chloride is added as one of the cis-1,4-polymerization catalysts to the solution obtained by adjusting the water content. As the organoaluminum chloride, a compound represented by the general formula, $AlR_nX_{3-n}$ is preferably used. As specific examples thereof, diethylaluminum monochloride, diethylaluminum monochloride, diisobutylaluminum monochloride, dicyclohexylaluminum monochloride, diphenylaluminum monochloride, diethylaluminum sesquichloride, and the like can be suitably enumerated. The amount of use of the organoaluminum chloride is preferably 0.1 mmoles or more, and more preferably from 0.5 to 50 mmoles per mole of the whole amount of the 1,3-butadiene.

Next, a soluble cobalt compound is added as one of other cis-1,4-polymerization catalysts to the mixed solution having an organoaluminum chloride added thereto, thereby subjecting the 1,3-dibutadiene to cis-1,4-polymerization. The soluble cobalt compound is a cobalt compound which is soluble in a hydrocarbon-based solvent to be used or is soluble in liquid 1,3-butadiene, or is able to be uniformly dispersed. Examples thereof include β-diketone complexes of cobalt such as cobalt(II) acetylacetonate and cobalt(III) acetylacetonate; β-keto-acid ester complexes of cobalt such as a cobalt ethylacetoacetate complex; cobalt salts of an organic carboxylic acid having 6 or more carbon atoms such as cobalt octoate, cobalt naphthenate, and cobalt benzoate; and halogenated cobalt complexes such as a cobalt chloride pyridine complex and a cobalt chloride ethyl alcohol complex. The amount of the soluble cobalt compound to be used is 0.001 mmoles or more, and especially preferably 0.005 mmoles or more based on one mole of 1,3-butadiene. Furthermore, a molar ratio of the organoaluminum chloride to the soluble cobalt compound (Al/Co) is 10 or more, and especially preferably 50 or more. Moreover, in addition to the soluble cobalt compound, an organic carboxylic acid salt of nickel, an organic complex salt of nickel, an organolithium compound, an organic carboxylic acid salt of neodymium, and an organic complex salt of neodymium can be used.

The temperature at which the cis-1,4-polymerization is carried out is generally from a temperature exceeding 0° C. to 100° C., preferably from 10 to 100° C., and more preferably from 20 to 100° C. The polymerization time (average residence time) is preferably in the range of from 10 minutes to 2 hours. It is preferred to carry out the cis-1,4-polymerization such that the polymer concentration after the cis-1,4-polymerization is from 5 to 26% by mass. As the polymerization tank, a single tank is used or two or more tanks are connected and used. The polymerization is carried out by stirring and mixing the solution within the polymerization tank (polymerizer). As the polymerization tank used for the polymerization, a polymerization tank equipped with a high-viscosity solution stirring unit, for example, a device as described in JP-B-40-2645 can be employed.

In the production of the vinyl-cis-polybutadiene rubber of the invention, at the time of the cis-1,4-polymerization, a known molecular weight modifier, for example, non-conjugated dienes such as cyclooctadiene, allene, and methylallene (1,2-butadiene); and α-olefins such as ethylene, propylene, and butene-1 can be used. Furthermore, in order to further inhibit the formation of a gel at the time of the polymerization, a known gelation preventing agent can be used. Furthermore, in general, the content of the cis-1,4-structure in the polymerization product is 80% or more, and preferably 90% or more, and the ML is from 10 to 50, and preferably from 10 to 40. A gel matter is not substantially contained.

Then, by adding an organoaluminum compound represented by the general formula, $AlR_3$ and carbon disulfide and optionally, the foregoing soluble cobalt compound as 1,2-polymerization catalysts to the thus obtained cis-1,4-polymerization reaction mixture, the 1,3-butadine is subjected to 1,2-polymerization, thereby producing a vinyl-cis-polybutadiene rubber. On this occasion, the unreacted 1,3-butadiene may be reacted by adding or not adding 1,3-butadiene to the subject polymerization reaction mixture. Suitable examples of the organoaluminum compound represented by the general formula, $AlR_3$ include trimethylaluminum, triethylaluminum, triisobutylaluminum, tri-n-hexylaluminum, and triphenylaluminum. The amount of the organoaluminum compound is 0.1 mmoles or more, and especially from 0.5 to 50 mmoles per mole of the 1,3-butadiene. Though the carbon disulfide is not particularly limited, water-free carbon disulfide is preferable. The concentration of the carbon disulfide is not more than 20 mmoles/L, and especially preferably from 0.01 to 10 mmoles/L. As a replacement of the carbon disulfide, known phenyl isothiocyanate and xanthogenic acid compounds may be used.

The temperature at which the 1,2-polymerization is carried out is generally from 0 to 100° C., preferably from 10 to 100° C., and more preferably from 20 to 100° C. In the 1,2-polymerization, by adding from 1 to 50 parts by mass, and preferably from 1 to 20 parts by mass, based on 100 parts by mass of the foregoing cis-1,4-polymerization reaction mixture, of 1,3-butadiene to the polymerization system, the yield of 1,2-polybutadiene at the time of the 1,2-polyerization can be increased. The polymerization time (average residence time) is preferably in the range of from 10 minutes to 2 hours. It is preferred to carry out the 1,2-polymerization such that the polymer concentration after the 1,2-polymerization is from 9 to 29% by mass. As the polymerization tank, a single tank is used or two or more tanks are connected and used. The polymerization is carried out by stirring and mixing the polymerization solution within the polymerization tank (polymerizer). With respect to the polymerization tank which is used for the 1,2-polymerization, since the viscosity becomes high during the 1,2-polymerization so that the polymer is liable to attach thereto, a polymerization tank equipped with a high-viscosity solution stirring unit, for example, a device as described in JP-B-40-2645 can be employed.

In the production of the vinyl-cis-polybutadiene rubber of the invention, when the vinyl-cis-polybutadiene rubber is produced by carrying out the cis-1,4-polymerization and subsequently the 1,2-polymberization as described previously, there is included a step for adding a high-molecular substance having at least one unsaturated double bond per a repeating unit and comprising at least one member selected from polyisoprene, crystalline polybutadiene having a melting point of not higher than 150° C., liquid polybutadiene and derivatives thereof within the production system of the vinyl-cis-polybutadiene rubber. After the production of a vinyl-cis-polybutadiene rubber, for example, even when such a substance is added at the time of compounding, the effects of the invention of this application are not obtained. With respect to the addition of this unsaturated high-molecular substance within the production system, the addition in the polymerization reaction mixture is preferably carried out at an arbitrary point of time of from the cis-1,4-polymerization to the 1,2-polymerization, and more preferably at the time of the 1,2-polymerization.

As the foregoing unsaturated high-molecular substance, at least one member selected from polyisoprene, crystalline polybutadiene having a melting point of lower than 170° C., linear polybutadiene, and derivatives thereof is preferable.

Examples of the polyisoprene include usually synthetic polyisoprene (for example, cis-1,4-polyisoprene in which the content of the cis-structure is 90% or more), liquid polyisoprene, trans-polyisoprene, and other modified polyisoprene.

The crystalline polybutadiene having a melting point of lower than 170° C. is preferably crystalline polybutadiene having a melting point of from 0 to 150° C., and examples thereof include low-melting point 1,2-polybutadiene and trans-polybutadiene.

Examples of the liquid polybutadiene include extremely low-molecular polybutadiene having an inherent viscosity [η] of not more than 1.

Furthermore, examples of these derivatives include an isoprene/isobutylene copolymer, an isoprene/styrene copolymer, a styrene/isoprene/styrene block copolymer, liquid epoxidized polybutadiene, liquid carboxyl-modified polybutadiene, and hydrogenation products of these derivatives.

Of the foregoing respective unsaturated high-molecular substances, polyisoprene, a styrene/isoprene/styrene block copolymer, and 1,2-polybutadiene having a melting point of from 70 to 110° C. are preferably used. Further, the foregoing respective unsaturated high-molecular substances can be used singly in admixture of two or more kinds thereof.

As described previously, when the foregoing unsaturated high-molecular substance is added, in the resulting vinyl-cis-polybutadiene rubber, the dispersibility of 1,2-polybutadiene having a melting point of 170° C. or higher into the cis-polybutadiene rubber as a matrix component is remarkably enhanced due to a compatible effect of the unsaturated high-molecular substance. As a result, the characteristics of the resulting vinyl-cis-polybutadiene rubber become excellent.

The amount of addition of the unsaturated high-molecular substance is preferably in the range of from 0.01 to 50% by mass, and more preferably from 0.01 to 30% by mass based on the vinyl-cis-polybutadiene rubber to be obtained. Furthermore, with respect to the addition at any point of time, after the addition, stirring is preferably carried out for from 10 minutes to 3 hours, and more preferably from 10 minutes to 30 minutes.

After the polymerization reaction has reached a predetermined rate of polymerization, a known antioxidant can be added according to the usual way. Representative examples of the antioxidant include phenol-based antioxidants such as 2,6-di-t-butyl-p-cresol (BHT); phosphorus-based antioxidants such as trinonylphenyl phosphite (TNP); and sulfur-based antioxidants such as 4,6-bis(octylthiomethyl)-o-cresol and dilauryl-3,3'-thiodipropionate (TPL). The antioxidant may be used singly or in combination of two or more kinds thereof. The amount of addition of the antioxidant is from 0.001 to 5 parts by mass based on 100 parts by mass of vinyl-cis-polybutadiene rubber. Next, a short stop agent is added to the polymerization system, thereby stopping the polymerization. This is carried out by a method which is known by itself, for example, a method in which after completion of the polymerization reaction, the polymerization reaction mixture is fed into a short stop tank and a large amount of a polar solvent such as alcohols such as methanol and ethanol and water is charged in this polymerization reaction mixture; and a method in which an inorganic acid such as hydrochloric acid and sulfuric acid, an organic acid such as acetic acid and benzoic acid, or a hydrogen chloride gas is introduced into the polymerization reaction mixture. Next, the formed vinyl-cis-polybutadiene rubber is separated, recovered, washed and dried to obtain the desired vinyl-cis-polybutadiene rubber according to the usual way.

In general, in the thus obtained vinyl-cis-polybutadiene rubber of the invention, the ratio of the respective components, namely the ratio of the 1,2-polybutadiene having a melting point of 170° C. or higher, the cis-polybutadiene rubber and the unsaturated high-molecular substance is as described previously. Furthermore, in the microstructure of the cis-polybutadiene rubber, 80% or more thereof is occupied by cis-1,4-polybutadiene, and the remainder consists of trans-1,4-polybutadiene and vinyl-1,2-polybutadiene. This cis-polybutadiene rubber and the unsaturated high-molecular substance are a boiling n-hexane soluble matter, and the 1,2-polybutadiene having a melting point of 170° C. or higher is a boiling n-hexane insoluble matter (hereinafter abbreviated as "H.I."). In general, this 1,2-polybutadiene having a melt point of 170° C. or higher has a melting point of from 170 to 220° C. and is a crystalline fiber in a short fiber state as described previously. Furthermore, as described previously, the ML of the cis-polybutadiene rubber is from 10 to 50, and preferably from 20 to 40.

Furthermore, as described previously, in the vinyl-cis-polybutadiene rubber of the invention, the 1,2-polybutadiene having a melting point of 170° C. or higher and the unsaturated high-molecular substance are uniformly dispersed in the matrix of the cis-polybutadiene rubber.

Figure 2:
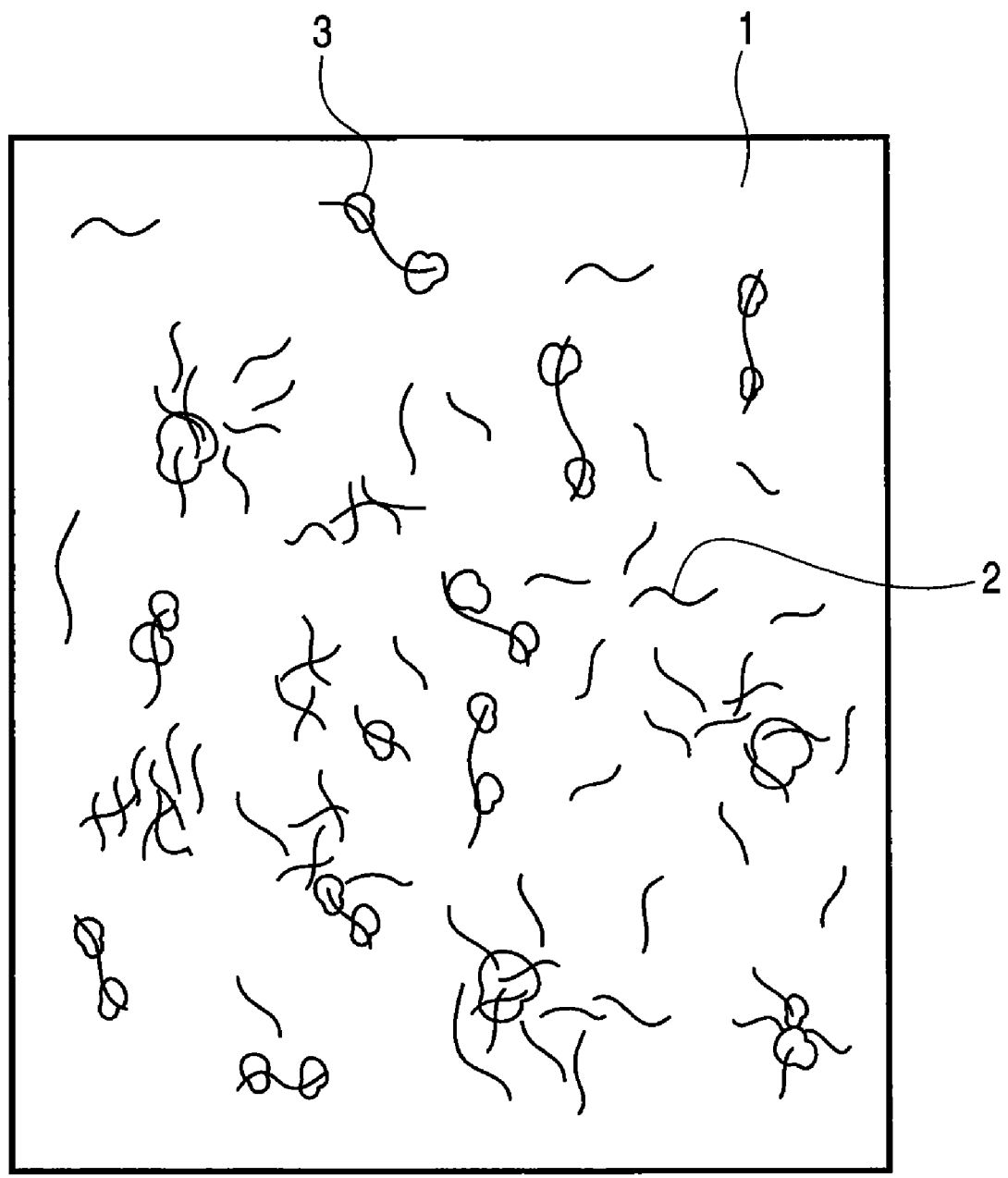
[FIG. 2] shows an embodiment in which a fine particle 3 of an unsaturated high-molecular substance is dispersed in a matrix 1 in a state that it is attached to a crystalline fiber 2 of 1,2-polybutadiene.
Figure 3:
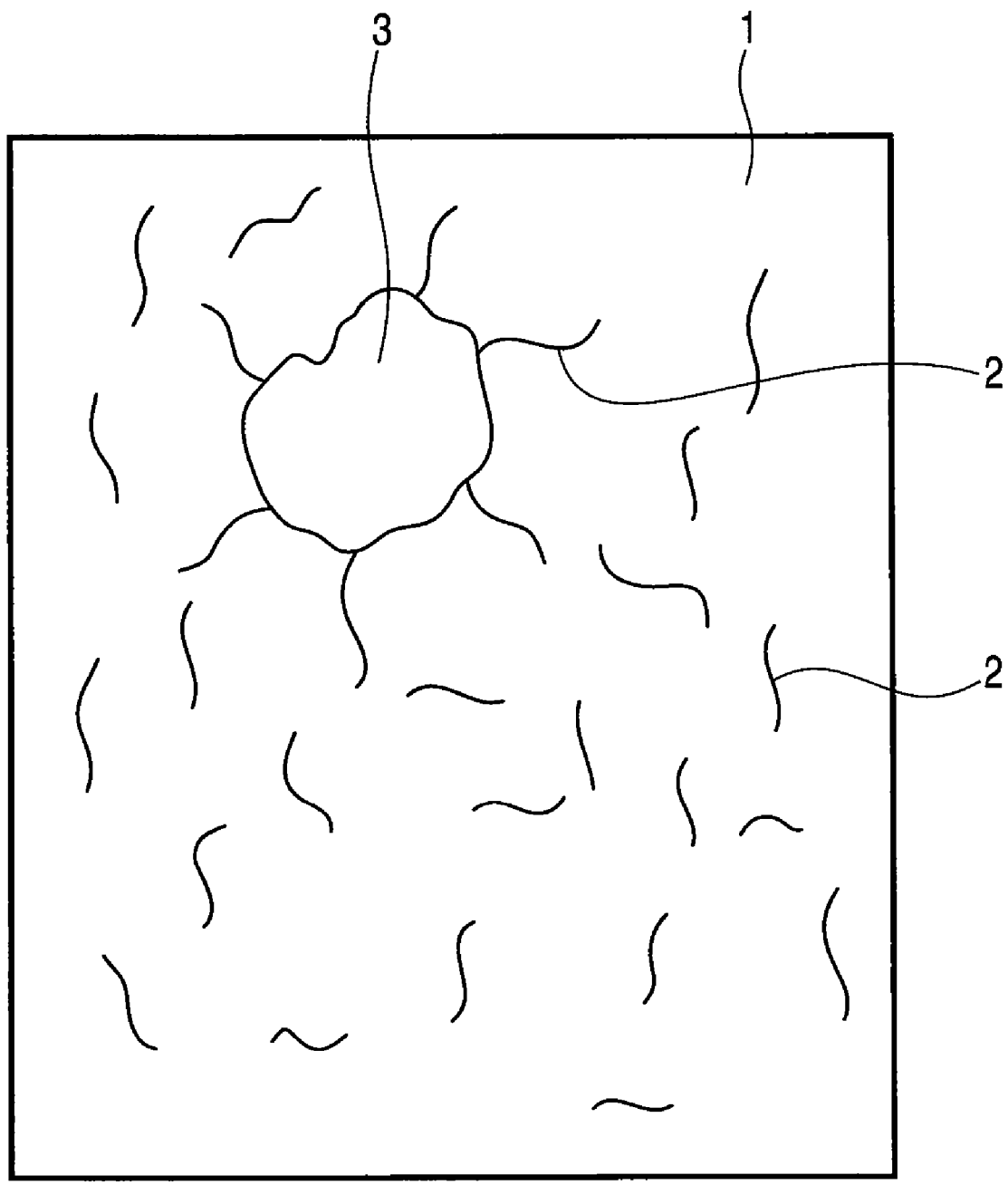
[FIG. 3] shows an embodiment in which a crystalline fiber 2 of 1,2-polybutadiene is dispersed in a matrix 1 in a state that it is attached to a fine particle 3 of an unsaturated high-molecular substance.
Figure 4:
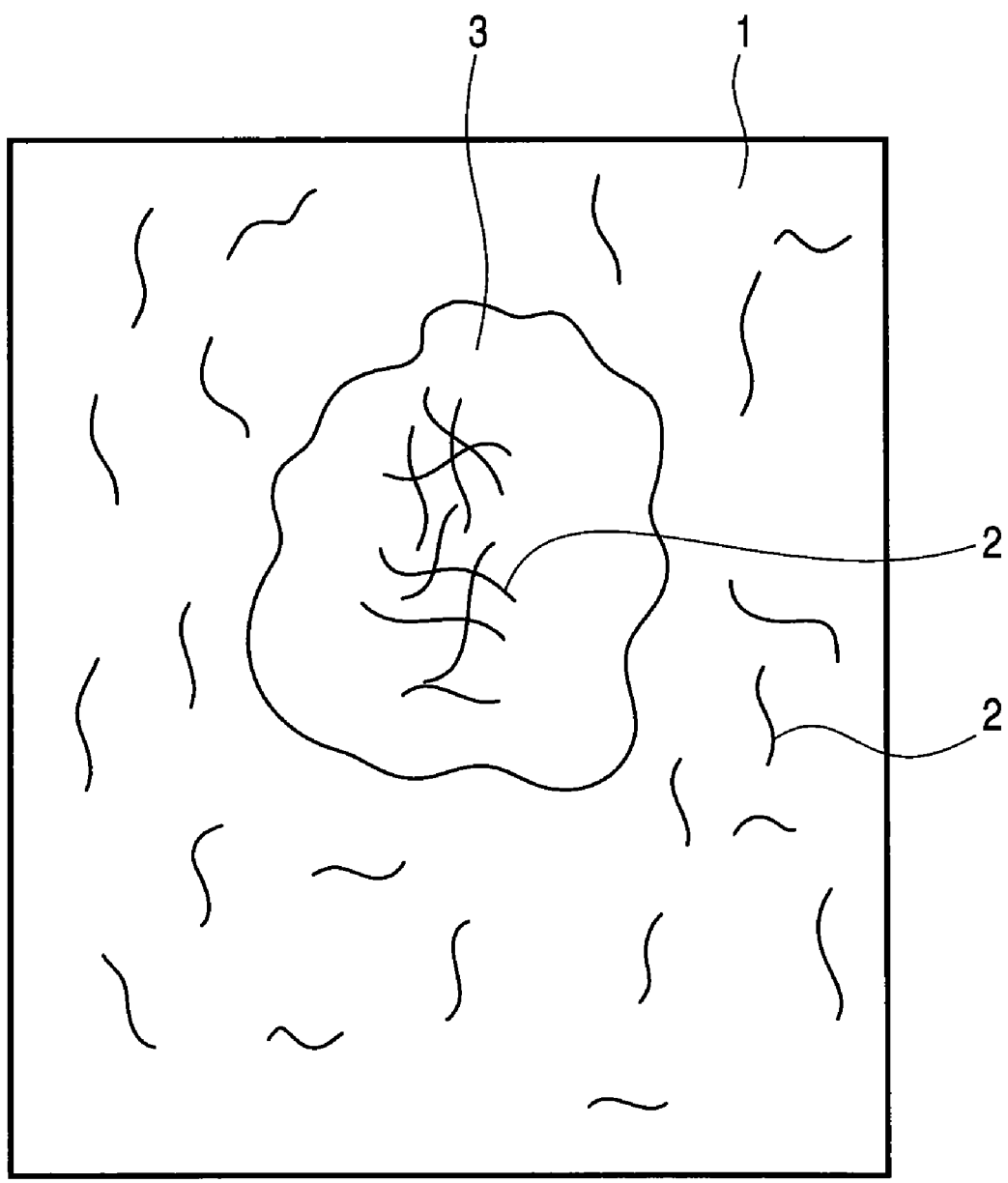
[FIG. 4] shows an embodiment in which a crystalline fiber 2 of 1,2-polybutadiene is dispersed in a matrix 1 in a state that it is included and dispersed in a fine particle 3 of an unsaturated high-molecular substance.

In general, in the vinyl-cis-polybutadiene rubber of the invention, as described previously, the 1,2-polybutadiene having a melting point of 170° C. or higher is dispersed as a crystalline fiber. Furthermore, the unsaturated high-molecular substance can be dispersed in an embodiment of every kind in relation to the crystalline fiber of the 1,2-polybutadiene having a melting point of 170° C. or higher. Examples of this dispersion embodiment include an embodiment in which a crystalline fiber 2 of 1,2-polybutadiene having a melting point of 170° C. or higher and a fine particle 3 of an unsaturated high-molecular substance are individually dispersed in a matrix 1 as conceptually shown in FIG. 1; an embodiment in which a fine particle 3 of an unsaturated high-molecular substance is dispersed in a matrix 1 in a state that it is attached to a crystalline fiber 2 of 1,2-polybutadiene as conceptually shown in FIG. 2; an embodiment in which a crystalline fiber 2 of 1,2-polybutadiene is dispersed in a matrix 1 in a state that it is attached to a fine particle 3 of an unsaturated high-molecular substance as conceptually shown in FIG. 3; and an embodiment in which a crystalline fiber 2 of 1,2-polybutadiene is dispersed in a matrix 1 in a state that it is included and dispersed in a fine particle 3 of an unsaturated high-molecular substance as conceptually shown in FIG. 4. Embodiments in which two kinds or more of the dispersion states as shown in FIGS. 1 to 4 coexist may be employed. In FIGS. 1 to 4, 1 stands for a matrix; 2 stands for a crystalline fiber of 1,2-polybutadiene having a melting point of 170° C. or higher; and 3 stands for a fine particle of an unsaturated high-molecular substance.

In the production process of the vinyl-cis-polybutadiene rubber of the invention, the 1,3-butadiene and the hydrocarbon-based solvent are separated from a mother liquor of the polymerization reaction mixture which remains after separating and obtaining the formed vinyl-cis-polybutadiene rubber and which contains the unreacted 1,3-butadiene, the hydrocarbon-based solvent and the carbon disulfide and so on usually by distillation; and the carbon disulfide is separated and removed by an adsorption and separation treatment of carbon disulfide or a separation treatment of a carbon disulfide adduct, thereby recovering the 1,3-butaidene and the hydrocarbon-based solvent which do not substantially contain carbon disulfide. Furthermore, 1,3-butadiene and the hydrocarbon-based solvent which do not substantially contain carbon disulfide can also be recovered by recovering the three components from the foregoing mother liquor of the polymerization reaction mixture by distillation and then separating and removing the carbon disulfide by the foregoing adsorption and separation or separation treatment of a carbon disulfide adduct. The thus recovered carbon disulfide and hydrocarbon-based solvent are mixed with 1,3-butaduene as newly replenished and then provided for reuse.

According to the foregoing production process of the vinyl-cis-polybutadiene rubber, it is possible to continuously produce the vinyl-cis-polybutadiene rubber of the invention industrially advantageously with excellent operability of the catalyst component and in a high catalytic efficiency. In particular, it is possible to continuously produce the vinyl-cis-polybutadiene rubber industrially advantageously in a high conversion without causing attachment to an inner wall in the polymerization tank, a stirring blade and other portions where stirring is slow.

Then, in order that the thus produced vinyl-cis-polybutadiene rubber reveals excellent desired characteristics, it is preferable that the 1,2-polybutadiene crystalline fiber as dispersed in the vinyl-cis-polybutadiene rubber is partially dispersed in a monodispersed state as a fine crystal in the matrix of the cis-polybutadiene rubber and coexists together with the large 1,2-polybutadiene crystalline fiber having a coagulation structure. That is, it is preferable that the monodispersed 1,2-polybutadiene crystalline fiber in the matrix of the cis-polybutadiene rubber is in a short fiber state in which a minor axis length of average monodispersed fiber crystals is not more than 0.2 μm, an aspect ratio is not more than 10, and the number of average monodispersed fiber crystals is 10 or more and has a melting point of 170° C. or higher. Furthermore, in addition to the 1,2-polybutadiene crystalline fiber having a melting point of 170° C. or higher, it is preferable that the unsaturated high-molecular substance is dispersed in the matrix of the cis-polybutadiene rubber. It is preferable that this unsaturated high-molecular substance has high affinity with the 1,2-polybutadiene crystalline fiber and is dispersed in a physically or chemically adsorbed state in the vicinity of the subject crystalline fiber in the matrix of the cis-polybutadiene rubber (the dispersion embodiments of FIGS. 2 to 4). As described previously, when the 1,2-polybutadiene crystalline fiber having a melting point of 170° C. or higher and the unsaturated high-molecular substance coexist and are dispersed in the matrix of the cis-polybutadiene rubber, the foregoing various physical properties become excellent, and therefore, such is preferable.

Next, a silica compounded rubber composition for tire which is used in the invention is formed by compounding (a) the foregoing vinyl-cis-polybutadiene rubber, (b) a diene-based rubber other than (a), and (c) a rubber reinforcing agent containing 40% or more of silica.

Also, a rubber composition for cap tread of passenger automobile tire which is used in the invention is formed by compounding (a) the foregoing vinyl-cis-polybutadiene rubber, (e) a styrene-butadiene rubber, (b) a diene-based rubber other than (a) and (e), and (d) a rubber reinforcing agent.

Also, a rubber composition for sidewall, a rubber composition for large-sized vehicle tire, a high-hardness compounded rubber composition, a rubber composition for base tread and a rubber composition for tire cord coating which are used in the invention are each formed by compounding (a) the foregoing vinyl-cis-polybutadiene rubber, (b) a diene-based rubber other than (a), and (c) a rubber reinforcing agent.

Examples of the foregoing diene-based rubber (b) include a high cis-polybutadiene rubber, a low cis-polybutadiene rubber (BR), a natural rubber, a polyisoprene rubber, an emulsion polymerized or solution polymerized styrene-bu-tadiene rubber (SBR), an ethylene-propylene-diene rubber (EPDM), a nitrile rubber (NBR), a butyl rubber (IIR), and a chloroprene rubber (CR).

Furthermore, derivatives of these rubbers, for example, polybutadiene rubbers modified with a tin compound and the foregoing rubbers which are subjected to epoxy modification, silane modification or maleic acid modification can also be used. These rubbers may be used singly or in combination with two or more kinds thereof.

As the rubber reinforcing agent which is the component (c) of the invention, carbon black having a particle size of not more than 90 nm and having an oil absorption of dibutyl phthalate (DBP) of 70 mL/100 g or more is enumerated, and examples thereof include FEF, FF, GPF, SAF, ISAF, SRF, and HAF. Furthermore, examples of the silica include silicic acid anhydride by the dry method and hydrated silicic acid and synthetic silicates by the wet method. In addition, examples of the rubber reinforcing agent include, in addition to various carbon blacks, inorganic reinforcing agents such as white carbon, activated calcium carbonate, and ultra-finely divided magnesium silicate; and organic reinforcing agents such as a syndiotactic 1,2-polybutadiene resin, a polyethylene resin, a polypropylene resin, a hi-styrene resin, a phenol resin, lignin, a modified melamine resin, a coumarone-indene resin, and a petroleum resin.

In the silica compounded rubber composition for tire of the invention, the foregoing respective components are compounded so as to satisfy the condition of 100 parts by weight of a rubber component of from 20 to 80% by weight of the vinyl-cis-polybutadiene (a) and from 80 to 20% by weight of the diene-based rubber (b) other than (a) and from 40 to 100 parts by weight of the rubber reinforcing agent containing 40% or more of silica (c).

When the amount of the foregoing vinyl-cis-polybutadiene is less than the foregoing lower limit, the die swell is large, and a rubber composition having low exothermic characteristics with respect to a vulcanizate thereof is not obtained, whereas when the amount of the vinyl-cis-polybutadiene exceeds the foregoing upper limit, the Mooney viscosity of the composition is excessively high so that the moldability becomes worse. When the amount of the foregoing rubber reinforcing agent is less than the foregoing lower limit, the elastic modulus of a vulcanizate thereof is lowered, whereas when it exceeds the foregoing upper limit, the Mooney viscosity is excessively high so that the moldability of tire is liable to become worse. Furthermore, when the proportion of the rubber falls outside the foregoing range, the abrasion resistance of a vulcanizate thereof and the like are lowered.

In the rubber composition for sidewall of the invention, the foregoing respective components are compounded so as to satisfy the condition of 100 parts by weight of a rubber component of from 20 to 80% by weight of the vinyl-cis-polybutadiene (a) and from 80 to 20% by weight of the diene-based rubber (b) other than (a) and from 25 to 60 parts by weight of the rubber reinforcing agent (c).

When the amount of the foregoing vinyl-cis-polybutadiene is less than the foregoing lower limit, the die swell is large, and a rubber composition having low fuel consumption with respect to a vulcanizate thereof is not obtained, whereas when the amount of the foregoing vinyl-cis-polybutadiene exceeds the foregoing upper limit, the Mooney viscosity of the composition is excessively high so that the moldability becomes worse. When the amount of the foregoing rubber reinforcing agent is less than the foregoing lower limit, the die swell becomes large, whereas when it exceeds the foregoing upper limit, the Mooney viscosity is excessively high so that kneading becomes difficult, and therefore, such is not preferable.

In the rubber composition for passenger automobile tire of the invention, the foregoing respective components are compounded so as to satisfy the condition of 100 parts by weight of a rubber component of from 10 to 50% by weight of the vinyl-cis-polybutadiene (a), from 30 to 70% by weight of the styrene-butadiene rubber (b) and from 0 to 60% by weight of the diene-based rubber (c) other than (a) and (b) and from 40 to 100 parts by weight of the rubber reinforcing agent (d)

When the amount of the foregoing vinyl-cis-polybutadiene is less than the foregoing lower limit, a rubber composition having a high elastic modulus with respect to a vulcanizate thereof is not obtained, whereas when the amount of the vinyl-cis-polybutadiene exceeds the foregoing upper limit, the Mooney viscosity of the composition is excessively high so that the moldability becomes worse. When the amount of the foregoing rubber reinforcing agent is less than the foregoing lower limit, the elastic modulus of a vulcanizate thereof is lowered, whereas when it exceeds the foregoing upper limit, the Mooney viscosity is excessively high so that the moldability of tire is liable to become worse. Furthermore, when the proportion of the rubber falls outside the foregoing range, the abrasion resistance of a vulcanizate thereof and the like are lowered.

In the rubber composition for large-sized vehicle tire of the invention, the foregoing respective components are compounded so as to satisfy the condition of 100 parts by weight of a rubber component of from 10 to 60% by weight of the vinyl-cis-polybutadiene (a) and from 90 to 40% by weight of the diene-based rubber (b) other than (a) and from 45 to 70 parts by weight of the rubber reinforcing agent (c).

When the amount of the foregoing vinyl-cis-polybutadiene is less than the foregoing lower limit, a rubber composition having a high elastic modulus with respect to a vulcanizate thereof is not obtained, whereas when the amount of the vinyl-cis-polybutadiene exceeds the foregoing upper limit, the Mooney viscosity of the composition is excessively high so that the moldability becomes worse. When the amount of the foregoing rubber reinforcing agent is less than the foregoing lower limit, the elastic modulus of a vulcanizate thereof is lowered, whereas when it exceeds the foregoing upper limit, the Mooney viscosity is excessively high so that the moldability of tire is liable to become worse. Furthermore, when the proportion of the rubber falls outside the foregoing range, the elastic modulus of a vulcanizate thereof and the like are lowered.

In the high-hardness compounded rubber composition of the invention, the foregoing respective components are compounded so as to satisfy the condition of 100 parts by weight of a rubber component of from 20 to 80% by weight of the vinyl-cis-polybutadiene (a) and from 80 to 20% by weight of the diene-based rubber (b) other than (a) and from 40 to 100 parts by weight of the rubber reinforcing agent (c).

When the amount of the foregoing vinyl-cis-polybutadiene is less than the foregoing lower limit, the die swell is large, and a rubber composition having low exothermic characteristics with respect to a vulcanizate thereof is not obtained, whereas when the amount of the vinyl-cis-polybutadiene exceeds the foregoing upper limit, the Mooney viscosity of the composition is excessively high so that the moldability becomes worse. When the amount of the foregoing rubber reinforcing agent is less than the foregoing lower limit, the die swell becomes large, whereas when it exceeds the foregoing upper limit, the Mooney viscosity is excessively high so that kneading becomes difficult, and therefore, such is not preferable.

In the rubber composition for base tread of the invention, the foregoing respective components are compounded so as to satisfy the condition of 100 parts by weight of a rubber component of from 20 to 80% by weight of the vinyl-cis-polybutadiene (a) and from 80 to 20% by weight of the diene-based rubber (b) other than (a) and from 25 to 55 parts by weight of the rubber reinforcing agent (c).

When the amount of the foregoing vinyl-cis-polybutadiene is less than the foregoing lower limit, the die swell is large, and a rubber composition having low exothermic characteristics with respect to a vulcanizate thereof is not obtained, whereas when the amount of the vinyl-cis-polybutadiene exceeds the foregoing upper limit, the Mooney viscosity of the composition is excessively high so that the moldability becomes worse. When the amount of the foregoing rubber reinforcing agent is less than the foregoing lower limit, the die swell becomes large, whereas when it exceeds the foregoing upper limit, the Mooney viscosity is excessively high so that kneading becomes difficult, and therefore, such is not preferable.

In the rubber composition for tire cord coating of the invention, the foregoing respective components are compounded so as to satisfy the condition of 100 parts by weight of a rubber component of from 10 to 60% by weight of the vinyl-cis-polybutadiene (a) and from 90 to 40% by weight of the diene-based rubber (b) other than (a) and from 30 to 80 parts by weight of the rubber reinforcing agent (c).

When the amount of the foregoing vinyl-cis-polybutadiene is less than the foregoing lower limit, a rubber composition having a high elastic modulus with respect to a vulcanizate thereof is not obtained, whereas when the amount of the vinyl-cis-polybutadiene exceeds the foregoing upper limit, the Mooney viscosity of the composition is excessively high so that the moldability becomes worse. When the amount of the foregoing rubber reinforcing agent is less than the foregoing lower limit, the elastic modulus of a vulcanizate thereof is lowered, whereas when it exceeds the foregoing upper limit, the Mooney viscosity is excessively high so that the moldability of tire is liable to become worse. Furthermore, when the proportion of the rubber falls outside the foregoing range, the elastic modulus of a vulcanizate thereof and the like are lowered, and adhesiveness to metals is lowered.

The rubber composition of the invention is obtained by kneading the foregoing respective components in the usual way by using a Banbury, an open roll, a kneader, a twin-screw kneading machine, etc. The kneading temperature is required to be lower than the melting point of the 1,2-polybutadiene crystal fiber which is contained in the subject vinyl-cis-polybutadiene. When kneading is carried out at a temperature of higher than this melting point of the 1,2-polybutadiene crystal fiber, fine short fibers in the vinyl-cis-polybutadiene are melted and deformed into a spherical particle or the like, and therefore, such is not preferable.

In the rubber composition of the invention, if desired, compounding agents which are usually used in the rubber field, such as a vulcanizer, a vulcanization aid, an antioxidant, a filler, a process oil, zinc white, and stearic acid, may be kneaded.

As the vulcanizer, known vulcanizers such as sulfur, organic peroxides, resin vulcanizers, and metal oxides such as magnesium oxide are useful.

As the vulcanization aid, known vulcanization aids such as aldehydes, ammonias, amines, guanidines, thioureas, thiazoles, thiurams, dithiocarbamates, and xanthates are useful.

Examples of the antioxidant include amine/ketone-based antioxidants, imidazole-based antioxidants, amine-based antioxidants, phenol-based antioxidants, sulfur-based antioxidants, and phosphorus-based antioxidants.

Examples of the filler include inorganic fillers such as calcium carbonate, basic magnetic carbonate, clay, litharge, and diatomaceous earth; and organic fillers such regenerated rubbers and powdered rubbers.

As the process oil, all of aromatic process oils, naphthene-based process oils, and paraffin-based process oils are useful.

The silica compounded rubber composition for tire of the invention can be designed to enhance the die swell performance, the abrasion resistant performance and the low fuel consumption performance while keeping the wet skid properties and is suitable for applications such as a tread or sidewall of a tire with a more highly balance of the performances.

The rubber composition for sidewall of the invention has a small die swell and has a low exothermic characteristic with respect to a vulcanizate thereof. Thus, it can be used as a tire member of passenger automobile, bus, truck, airplane, run flat tire, etc. in combination with other tire member (for example, cap tread, sidewall, sidewall reinforcing layer, base tread, carcass, belt, and bead) in place of the conventionally known rubber compositions for sidewall.

The rubber composition for passenger automobile tire of the invention has excellent extrusion molding processability and has satisfactory characteristics in high-speed running properties, grip properties on a wet road surface and abrasion resistance. Thus, it can be used as a tire member of passenger automobile, bus, truck, airplane, run flat tire, etc. in combination with other tire member (for example, cap tread, sidewall, sidewall reinforcing layer, base tread, carcass, belt, and bead) in place of the conventionally known rubber compositions for cap tread.

The rubber composition for large-sized vehicle tire of the invention has a small die swell and has excellent extrusion processability while keeping a high elastic modulus. Thus, it can be used as a tire member of passenger automobile, bus, truck, airplane, run flat tire, etc. in combination with other tire member (for example, cap tread, sidewall, sidewall reinforcing layer, base tread, carcass, belt, and bead) in place of the conventionally known rubber compositions for cap tread.

The high-hardness compounded rubber composition of the invention has a small die swell and has a low exothermic characteristic with respect to a vulcanizate thereof. Thus, it can be used as a tire member of passenger automobile, bus, truck, airplane, run flat tire, etc. in combination with other tire member (for example, cap tread, sidewall, sidewall reinforcing layer, base tread, carcass, belt, and bead) in place of the conventionally known high-hardness compounded rubber compositions.

The rubber composition for base tread of the invention has a small die swell and has a low exothermic characteristic with respect to a vulcanizate thereof. Thus, it can be used as a tire member of passenger automobile, bus, truck, airplane, run flat tire, etc. in combination with other tire member (for example, cap tread, sidewall, sidewall reinforcing layer, base tread, carcass, belt, and bead) in place of the conventionally known rubber compositions for base tread.

The rubber composition for tire cord coating of the invention has a small die swell and a large green strength and has excellent extrusion molding processability and moldability while keeping a high elastic modulus. Thus, it can be used as a tire member of passenger automobile, bus, truck, airplane, run flat tire, etc. in combination with other tire member (for example, cap tread, sidewall, sidewall reinforcing layer, base tread, carcass, belt, and bead) in place of the conventionally known rubber compositions for tire cord coating.

EXAMPLE 1

Examples based on the invention and Comparative Examples will be specifically described below. In the Examples and Comparative Examples, physical properties of a raw rubber of the resulting vinyl-cis-polybutadiene rubber, physical properties of a compounded material of the resulting rubber composition, and physical properties of a vulcanizate thereof were measured in the following manners.

(1) Content of 1,2-polybutadiene crystalline fiber:
An extraction residue resulting from subjecting 2 g of a vinyl-cis-polybutadiene rubber to boiling extraction with 200 mL of n-hexane for 4 hours by a Soxhlet extractor was expressed in terms of parts by weight.

(2) Melting point of 1,2-polybutadiene crystalline fiber:
An extraction residue of boiling n-hexane was determined by a peak temperature of the endothermic curve by a differential scanning calorimeter (DSC).

(3) Crystalline fiber form:
The vinyl-cis-polybutadiene rubber was vulcanized with sulfur monochloride and carbon disulfide; a vulcanizate was cut out into an ultra-thin section; and the double bond of the rubber segment of the vinyl-cis-polybutadiene was dyed with an osmium tetrachloride vapor and determined by observation by a transmission electron microscope.

(4) Microstructure of rubber segment in vinyl-cis-polybutadiene rubber:
An infrared absorption spectral analysis was carried out. The microstructure was calculated from an absorption intensity ratio of cis at 740 $cm^{-1}$, trans at 967 $cm^{-1}$ and vinyl at 910 $cm^{-1}$.

(5) Viscosity in toluene solution of rubber segment in vinyl-cis-polybutadiene rubber:
A viscosity in a 5% by weight toluene solution at 25° C. was measured and expressed in terms of centipoises (cp).

(6) [η] of rubber segment in vinyl-cis-polybutadiene rubber:
A boiling n-hexane soluble matter was collected by drying and measured in a toluene solution at a temperature of 30° C.

(7) Mooney viscosity:
A value measured at 100° C. according to JIS K6300.

(8) Die swell:
As an estimation for extrusion processability of a compounded material, a ratio of the size of a compounded material and the die orifice size (wherein L/D=1.5 mm/1.5 mm) was measured and determined at the time of extrusion at 100° C. and at a shear rate of 100 $sec^{-1}$ by using a processability analyzer (MPT, manufactured by Monsanto).

(9) Tensile elastic modulus:
A tensile elastic modulus M300 was measured according to JIS K6301.

(10) Pico abrasion:
A Pico abrasion index was measured according to ASTM D2228.

(11) Wet skid properties:
This was measured by using a potable wet skid tester and 3M's Safety-Walk (Type B).

(12) Low fuel consumption (low exothermic characteristics or exothermic characteristic):
A heat build-up of a rubber composition was measured in a fixed stress mode with a static load of 196 N under conditions of a temperature of 40° C. and a frequency of 10 Hz. The smaller the index, the more excellent the fuel consumption is.

(13) Hardness:
This was measured at room temperature by using a type A durometer according to JIS K6253.

(14) Green modulus:
An unvulcanized rubber was punched out by a No. 3 dumbbell to prepare a specimen, which was then measured at room temperature at a drawing rate of 200 mm/min.

(15) Adhesive strength to metal:
This was measured according to ASTM D2229.

(Production of Vinyl-cis-polybutadiene Sample 1)
In a stirrer-equipped stainless steel-made reaction tank having an internal volume of 30 L and purged with a nitrogen gas, a solution of 1.6 kg of 1,3-butadiene dissolved in 18 kg of absolute cyclohexane was charged, to which were then added 4 mmoles of cobalt octoate, 84 mmoles of diethylaluminum chloride and 70 mmoles of 1,5-cyclooctadiene, and the mixture was stirred at 25° C. for 30 minutes, thereby undergoing cis-polymerization. The resulting polymer had an ML of 33 and a T-cp of 59 and had a microstructure consisting of 0.9% of the 1,2-structure, 0.9% of the trans-1,4-structure and 98.2% of the cis-1,4-structure. After the cis-polymerization, 5% by mass (percentage based on the resulting vinyl-cis-polybutadiene rubber) of an unsaturated high-molecular substance consisting of polyisoprene (IR) (ML: 87,cis-1,4-structure: 98%) was added to the resulting polymerization product solution, and the mixture was stirred at 25° C. for one hour. Immediately thereafter, 90 mmoles of triethylaluminum and 50 mmoles of carbon disulfide were added to the polymerization solution, and the mixture was stirred at 25° C. for 60 minutes, thereby undergoing 1,2-polymerization. After completion of the polymerization, the polymerization product solution was added to 18 L of methanol containing 1% by mass of 4,6-bis(octylthiomethyl)-o-cresol, thereby depositing and precipitating a rubbery polymer. This rubbery polymer was separated, washed with methanol and then dried in vacuo at the normal temperature. The thus obtained vinyl-cis-polybutadiene rubber had a percent yield of 80%. Thereafter, this vinyl-cis-polybutadiene rubber was treated with boiling n-hexane, and an insoluble matter and a soluble matter were separated and dried. The resulting boiling n-hexane soluble polymer had an ML of 31, a T-cp of 57 and a T-cp/ML relation of about 1.8 and had a microstructure consisting of 1.0% of the 1,2-structure, 0.9% of the trans-1,4-structure and 98.1% of the cis-1,4-structure. Furthermore, the [η] was 1.7. The number of monodispersed fiber crystals having a minor axis length of not more than 0.2 μm, which were contained in the vinyl-cis-polybutadiene rubber, was 100 or more, the aspect ratio was not more than 10, and the melting point was 202° C.

(Production of Vinyl-cis-polybutadiene Sample 2)
A vinyl-cis-polybutadiene was obtained in the same manner as in the production process of the sample 1, except for not adding the unsaturated high-molecular substance (additive).
Physical properties of the foregoing sample 1 and sample 2 are shown in Table 1.

TABLE 1

| | | Sample Name | |
|---|---|---|---|
| | | Sample 1 | Sample 2 |
| | High-molecular substance (Amount of addition) | IR (10% by weight) | Nil |
| | Polymerization solvent | Cyclohexane | ← |
| | (SP value of polymerization solvent) | 8.1 | ← |
| Characteristics of matrix in vinyl-cis-polybutadiene rubber | Mooney viscosity | 31 | ← |
| | [η] | 1.7 | 1.4 |
| | Viscosity in toluene solution (cp) | 57 | ← |
| | Microstructure (%)     Cis | 98.1 | ← |
| |                        Trans | 0.9 | ← |
| |                        Vinyl | 1.0 | ← |
| Characteristics of 1,2-polybutadiene crystalline fiber | Melting point of fiber crystal (° C.) | 202 | ← |
| | Number of monodispersed fiber crystals: (Number of crystals having a minor axis length of not more than 0.2 μ per 400 μ²) | 100 or more | 4 |
| | Aspect ratio of monodispersed fiber crystal | Not more than 10 | 20 or more |
| | Major axis size of crystalline fiber dispersed in matrix | 0.2 to 0.5 | 1 or more |
| | Major axis size of crystalline fiber dispersed in high-molecular substance | Not more than 0.1 | — |
| | % by weight of 1,2-polybutadiene | 12 | ← |
| | Number of monodispersed fiber crystals | Large | Small |

EXAMPLES 1-1 to 1-4 AND COMPARATIVE EXAMPLES 1-1 to 1-3

By using each of the foregoing sample 1 and sample 2, compounding agents other than a vulcanization accelerator and sulfur in a compounding preparation as shown in Table 2 were kneaded by using a 1.7-L Banbury mixer for testing, thereby obtaining a kneaded material which is a silica compounded rubber composition for tire. On this occasion, a maximum kneading temperature was adjusted at 170 to 180° C. Next, this kneaded material was kneaded with a vulcanization accelerator and sulfur on a 10-inch roll, and the mixture was rolled in a sheet form and then charged in a die for vulcanization, thereby obtaining a vulcanizate. The vulcanization was carried out at 150° C. for 30 minutes. The results are summarized and shown in Table 2.

The compositions of the Examples realize a small die swell, high abrasion resistance and low fuel consumption while keeping wet skid properties as compared with the case of using commercially available high cis-polybutadiene as in the Comparative Examples. On the other hand, in the compositions of the Comparative Examples, when the vinyl-cis-polybutadiene which does not meet the characteristics of the invention is used or the amount of addition of silica is low, although a small die swell and high abrasion resistance are realized, a remarkable lowering of the wet skid properties is caused so that the desired characteristics cannot be obtained.

TABLE 2

| | Example | | | | Comparative Example | | |
|---|---|---|---|---|---|---|---|
| Compounding table | 1-1 | 1-2 | 1-3 | 1-4 | 1-1 | 1-2 | 1-3 |
| Kind of vinyl-cis-polybutadiene | Sample 1 | Sample 1 | Sample 1 | Sample 1 | — | Sample 2 | Sample 1 |
| Amount (parts) | 35 | 35 | 45 | 35 | — | 35 | 35 |
| NR (Note 1) | — | 25 | 15 | — | — | — | — |
| BR (Note 2) | — | — | — | — | 35 | — | — |
| SRB1500 | 65 | 40 | 40 | 65 | 65 | 65 | 65 |
| Carbon black N330 | 27 | 27 | 27 | 21.5 | 27 | 27 | 60 |
| Silica (Note 3) | 30 | 30 | 30 | 35 | 30 | 30 | — |
| Silane coupling agent (Note 4) | 6 | 6 | 6 | 7 | 6 | 6 | — |
| Aromatic oil | 15 | 15 | 15 | 15 | 15 | 15 | 15 |
| Zinc oxide | 5 | 5 | 5 | 5 | 5 | 5 | 3 |
| Stearic acid | 2 | 2 | 2 | 2 | 2 | 2 | 2 |
| Antioxidant (Note 5) | 1 | 1 | 1 | 1 | 1 | 1 | 1 |
| Vulcanization accelerator (Note 6) | 1.3 | 1.3 | 1.3 | 1.4 | 1.3 | 1.3 | 1 |
| Vulcanization accelerator (Note 7) | 0.7 | 0.7 | 0.7 | 0.9 | 0.7 | 0.7 | — |
| Sulfur | 2 | 2 | 2 | 21 | 2 | 2 | 1.8 |
| Physical properties of compounded material: | | | | | | | |
| Die swell index | 73 | 79 | 77 | 78 | 100 | 92 | 68 |

TABLE 2-continued

| Compounding table | Example | | | | Comparative Example | | |
|---|---|---|---|---|---|---|---|
| | 1-1 | 1-2 | 1-3 | 1-4 | 1-1 | 1-2 | 1-3 |
| Physical properties of vulcanizate | | | | | | | |
| Pico abrasion (index) | 172 | 160 | 180 | 163 | 100 | 160 | 185 |
| Wet skid properties (index) | 99 | 98 | 98 | 100 | 100 | 91 | 90 |
| Low fuel consumption (index) | 89 | 89 | 79 | 83 | 100 | 103 | 110 |

(Note 1) NR: RSS#1
(Note 2) BR: Polybutadiene (UBEPOL-BR150, manufacture by Ube Industries, Ltd.)
(Note 3) Ultrasil VN3 GR (manufactured by Degussa)
(Note 4) X50S (Equal-amount mixture of N330 and Si69, manufactured by Degussa)
Si69: Bis(3-triethoxysilylpropyl)-tetrasulfide
(Note 5) Antioxidant: ANTAGE AS (a reaction product between amine and ketone)
(Note 6) Vulcanization accelerator: NOCCELER CZ (N-cyclo-hexyl-2-benzothiazole sulfenamide)
(Note 7) Vulcanization accelerator: NOCCELER D (N,N'-diphenylguanidine)

EXAMPLES 2-1 to 2-5 AND COMPARATIVE EXAMPLES 2-1 to 2-4

By using each of the foregoing sample 1 and sample 2, compounding agents other than a vulcanization accelerator and sulfur in a compounding preparation as shown in Table 3 were kneaded by using a 1.7-L Banbury mixer for testing, thereby obtaining a kneaded material which is a rubber composition for sidewall. On this occasion, a maximum kneading temperature was adjusted at 170 to 180° C. Next, this kneaded material was kneaded with a vulcanization accelerator and sulfur on a 10-inch roll, and the mixture was rolled in a sheet form and then charged in a die for vulcanization, thereby obtaining a vulcanizate. The vulcanization was carried out at 150° C. for 30 minutes. The results are summarized and shown in Table 3.

The compositions of the Examples are greatly improved with respect to the elastic modulus and highly balanced between the die swell and the exothermic characteristic as compared with the case of using commercially available high cis-polybutadiene as in the Comparative Examples. On the other hand, in the compositions of the Comparative Examples, when the commercially available BR is used, the die swell is large; and when the compounding amount of carbon black is high, the exothermic characteristic is deteriorated. Furthermore, when vinyl-cis-polybutadiene which is not satisfied in the invention is used or the amount of use of vinyl-cis-polybutadiene of the invention is low, the improvement effects did not reached the expected levels.

TABLE 3

| Compounding table | Example | | | | | Comparative Example | | | |
|---|---|---|---|---|---|---|---|---|---|
| | 2-1 | 2-2 | 2-3 | 2-4 | 2-5 | 2-1 | 2-2 | 2-3 | 2-4 |
| Kind of vinyl-cis-poly-butadiene | Sample 1 | Sample 1 | Sample 1 | Sample 1 | Sample 1 | — | Sample 2 | Sample 1 | Sample 1 |
| Amount (parts) | 60 | 60 | 60 | 80 | 40 | — | 60 | 60 | 10 |
| NR (Note 1) | 40 | 40 | 40 | 20 | 60 | 40 | 40 | 40 | 90 |
| BR (Note 2) | — | — | — | — | — | 60 | — | — | — |
| Carbon black N330 | 40 | 55 | 30 | 40 | 40 | 40 | 40 | 70 | 40 |
| Aromatic oil | 10 | 10 | 10 | 10 | 10 | 10 | 10 | 10 | 10 |
| Zinc oxide | 3 | 3 | 3 | 3 | 3 | 3 | 3 | 3 | 3 |
| Stearic acid | 2 | 2 | 2 | 2 | 2 | 2 | 2 | 2 | 2 |
| Antioxidant (Note 3) | 1 | 1 | 1 | 1 | 1 | 1 | 1 | 1 | 1 |
| Vulcanization accelerator (Note 4) | 1.0 | 1.0 | 1.0 | 0.9 | 0.8 | 1.0 | 1.0 | 1.0 | 0.7 |
| Sulfur | 1.5 | 1.5 | 1.5 | 1.7 | 2.0 | 1.5 | 1.5 | 1.5 | 2.2 |
| Physical properties of compounded material: | | | | | | | | | |
| Die swell index | 73 | 64 | 84 | 68 | 83 | 100 | 90 | 58 | 98 |
| Physical properties of vulcanizate: | | | | | | | | | |
| 300% tensile elastic modulus (index) | 190 | 240 | 160 | 165 | 185 | 100 | 135 | 269 | 104 |

TABLE 3-continued

|  | Example | | | | | Comparative Example | | | |
|---|---|---|---|---|---|---|---|---|---|
| Compounding table | 2-1 | 2-2 | 2-3 | 2-4 | 2-5 | 2-1 | 2-2 | 2-3 | 2-4 |
| Exothermic characteristic (index) | 80 | 90 | 69 | 75 | 86 | 100 | 104 | 107 | 101 |

(Note 1) NR: RSS#1
(Note 2) BR: Polybutadiene (UBEPOL-BR150, manufacture by Ube Industries, Ltd.)
(Note 3) Antioxidant: ANTAGE AS (a reaction product between amine and ketone)
(Note 4) Vulcanization accelerator: NOCCELER CZ (N-cyclohexyl-2-benzothiazole sulfenamide)

EXAMPLES 3-1 to 3-4 AND COMPARATIVE EXAMPLES 3-1 to 3-5

By using each of the foregoing sample 1 and sample 2, compounding agents other than a vulcanization accelerator and sulfur in a compounding preparation as shown in Table 4 were kneaded by using a 1.7-L Banbury mixer for testing, thereby obtaining a kneaded material which is a rubber composition for cap tread of passenger automobile tire. On this occasion, a maximum kneading temperature was adjusted at 170 to 180° C. Next, this kneaded material was kneaded with a vulcanization accelerator and sulfur on a 10-inch roll, and the mixture was rolled in a sheet form and then charged in a die for vulcanization, thereby obtaining a vulcanizate. The vulcanization was carried out at 150° C. for 30 minutes. The results are summarized and shown in Table 4.

The compositions of the Examples realize a high elastic modulus and high abrasion resistance while keeping wet skid properties as compared with the case of using commercially available high cis-polybutadiene as in the Comparative Examples. On the other hand, in the compositions of the Comparative Examples, when the vinyl-cis-polybutadiene which does not meet the characteristics of the invention is used or the amount of addition of SBR is low, although a high elastic modulus and high abrasion resistance are realized, a remarkable lowering of the wet skid properties is caused so that the desired characteristics cannot be obtained.

TABLE 4

|  | Example | | | | Comparative Example | | | | |
|---|---|---|---|---|---|---|---|---|---|
| Compounding table | 3-1 | 3-2 | 3-3 | 3-4 | 3-1 | 3-2 | 3-3 | 3-4 | 3-5 |
| Kind of vinyl-cis-poly-butadiene | Sample 1 | Sample 1 | Sample 1 | Sample 1 | — | Sample 2 | — | Sample 1 | Sample 1 |
| Amount (parts) | 35 | 35 | 45 | 20 | — | 35 | — | 35 | 65 |
| NR (Note 1) | — | 25 | 15 | 40 | 35 | — | — | 55 | — |
| BR (Note 2) | — | — | — | — | — | — | 35 | — | — |
| SBR1500 | 65 | 40 | 40 | 40 | 65 | 65 | 65 | 10 | 35 |
| Carbon black N330 | 60 | 60 | 60 | 60 | 60 | 60 | 60 | 60 | 60 |
| Aromatic oil | 15 | 15 | 15 | 15 | 15 | 15 | 15 | 15 | 15 |
| Zinc oxide | 3 | 3 | 3 | 3 | 3 | 3 | 3 | 3 | 3 |
| Stearic acid | 2 | 2 | 2 | 2 | 2 | 2 | 2 | 2 | 2 |
| Antioxidant (Note 3) | 1 | 1 | 1 | 1 | 1 | 1 | 1 | 1 | 1 |
| Vulcanization accelerator (Note 4) | 1.5 | 1.2 | 1.3 | 1.2 | 1.4 | 1.5 | 1.5 | 1.0 | 1.3 |
| Sulfur | 1.8 | 1.9 | 1.8 | 2.0 | 2.1 | 1.8 | 1.8 | 2.0 | 1.7 |
| Physical properties of compounded material: | | | | | | | | | |
| Die swell index | 73 | 80 | 72 | 87 | 100 | 92 | 105 | 90 | 62 |
| Physical properties of vulcanizate: | | | | | | | | | |
| 300% tensile elastic modulus (index) | 183 | 174 | 190 | 151 | 100 | 126 | 88 | 160 | 215 |
| Pico abrasion (index) | 177 | 163 | 183 | 152 | 100 | 164 | 146 | 138 | 201 |
| Wet skid properties (index) | 99 | 97 | 96 | 98 | 100 | 91 | 88 | 94 | 93 |

(Note 1) NR: RSS#1
(Note 2) BR: Polybutadiene (UBEPOL-BR150, manufacture by Ube Industries, Ltd.)
(Note 3) Antioxidant: ANTAGE AS (a reaction product between amine and ketone)
(Note 4) Vulcanization accelerator: NOCCELER CZ (N-cyclohexyl-2-benzothiazole sulfenamide)

EXAMPLES 4-1 to 4-3 AND COMPARATIVE EXAMPLES 4-1 to 4-2

By using each of the foregoing sample 1 and sample 2, compounding agents other than a vulcanization accelerator and sulfur in a compounding preparation as shown in Table 5 were kneaded by using a 1.7-L Banbury mixer for testing, thereby obtaining a kneaded material which is a rubber composition for cap tread of large-sized vehicle tire. On this occasion, a maximum kneading temperature was adjusted at 170 to 180° C. Next, this kneaded material was kneaded with a vulcanization accelerator and sulfur on a 10-inch roll, and the mixture was rolled in a sheet form and then charged in a die for vulcanization, thereby obtaining a vulcanizate. The vulcanization was carried out at 150° C. for 30 minutes. The results are summarized and shown in Table 5.

The compositions of the Examples realize a small die swell and excellent wet skid properties and abrasion resistance while keeping a high elastic modulus as compared with the case of using commercially available high cis-polybutadiene as in the Comparative Examples. On the other hand, in the compositions of the Comparative Examples, since the vinyl-cis-polybutadiene which does not meet the characteristics of the invention is used, the abrasion resistance is not improved or a lowering of the wet skid properties is caused so that the desired characteristics cannot be obtained.

EXAMPLES 5-1 to 5-5 AND COMPARATIVE EXAMPLES 5-1 and 5-2

By using each of the foregoing sample 1 and sample 2, compounding agents other than a vulcanization accelerator and sulfur in a compounding preparation as shown in Table 6 were kneaded by using a 1.7-L Banbury mixer for testing, thereby obtaining a kneaded material which is a high-hardness compounded rubber composition. On this occasion, a maximum kneading temperature was adjusted at 170 to 180° C. Next, this kneaded material was kneaded with a vulcanization accelerator and sulfur on a 10-inch roll, and the mixture was rolled in a sheet form and then charged in a die for vulcanization, thereby obtaining a vulcanizate. The vulcanization was carried out at 150° C. for 30 minutes. The results are summarized and shown in Table 6.

The compositions of the Examples are greatly improved with respect to the elastic modulus and highly balanced between the die swell and the low exothermic characteristics. On the other hand, in the compositions of the Comparative Examples, when the commercially available BR is used, the die swell is large; and when the compounding amount of carbon black is high, the exothermic characteristic is deteriorated. Furthermore, when vinyl-cis-polybutadiene which is not satisfied in the invention is used or the amount of use of vinyl-cis-polybutadiene of the invention is low, the improvement effects did not reached the expected levels.

TABLE 5

| Compounding table | Example | | | Comparative Example | |
|---|---|---|---|---|---|
| | 4-1 | 4-2 | 4-3 | 4-1 | 4-2 |
| Kind of vinyl-cis-polybutadiene | Sample 1 | Sample 1 | Sample 1 | — | Sample 2 |
| Amount (parts) | 30 | 20 | 30 | — | 30 |
| NR (Note 1) | 70 | 80 | 70 | 70 | 70 |
| BR (Note 2) | — | — | — | 30 | — |
| Carbon black N330 | 60 | 60 | 50 | 60 | 60 |
| Aromatic oil | 10 | 10 | 10 | 10 | 10 |
| Zinc oxide | 3 | 3 | 3 | 3 | 3 |
| Stearic acid | 2 | 2 | 2 | 2 | 2 |
| Antioxidant (Note 3) | 1 | 1 | 1 | 1 | 1 |
| Vulcanization accelerator (Note 4) | 0.8 | 0.8 | 0.8 | 0.8 | 0.8 |
| Sulfur | 1 | 1 | 1 | 1 | 1 |
| Physical properties of compounded material: | | | | | |
| Die swell index | 74 | 82 | 80 | 100 | 95 |
| Physical properties of vulcanizate: | | | | | |
| 300% tensile elastic modulus (index) | 173 | 154 | 127 | 100 | 128 |
| Pico abrasion (index) | 163 | 144 | 125 | 100 | 133 |
| Wet skid properties (index) | 105 | 104 | 105 | 100 | 94 |

(Note 1) NR: RSS#1
(Note 2) BR: Polybutadiene (UBEPOL-BR150, manufacture by Ube Industries, Ltd.)
(Note 3) Antioxidant: ANTAGE AS (a reaction product between amine and ketone)
(Note 4) Vulcanization accelerator: NOCCELER CZ (N-cyclohexyl-2-benzothiazole sulfenamide)

TABLE 6

| Compounding table | Example | | | | | Comparative Example | |
|---|---|---|---|---|---|---|---|
| | 5-1 | 5-2 | 5-3 | 5-4 | 5-5 | 5-1 | 5-2 |
| Kind of vinyl-cis-polybutadiene | Sample 1 | Sample 1 | Sample 1 | Sample 1 | Sample 1 | — | Sample 1 |
| Amount (parts) | 50 | 70 | 30 | 50 | 50 | — | 50 |
| NR (Note 1) | 50 | 30 | 70 | 50 | 50 | 50 | 50 |
| BR (Note 2) | — | — | — | — | — | 50 | — |
| Carbon black N330 | 70 | 70 | 70 | 60 | 80 | 70 | 70 |
| Aromatic oil | 5 | 5 | 5 | 10 | 10 | 5 | 5 |
| Zinc oxide | 5 | 5 | 5 | 3 | 3 | 5 | 5 |
| Stearic acid | 2 | 2 | 2 | 2 | 2 | 2 | 2 |
| Antioxidant (Note 3) | 1 | 1 | 1 | 1 | 1 | 1 | 1 |
| Vulcanization accelerator (Note 4) | 1.0 | 1.2 | 0.8 | 1.0 | 1.0 | 1.0 | 1.0 |
| Sulfur | 3.0 | 2.8 | 3.2 | 3.0 | 3.0 | 3.0 | 3.0 |
| Physical properties of compounded material: | | | | | | | |
| Die swell index | 75 | 68 | 85 | 83 | 65 | 100 | 89 |
| Physical properties of vulcanizate | | | | | | | |
| Hardness (index) | 124 | 134 | 16 | 116 | 130 | 100 | 109 |
| Low exothermic characteristics (index) | 80 | 73 | 87 | 68 | 84 | 100 | 104 |

(Note 1) NR: RSS#1
(Note 2) BR: Polybutadiene (UBEPOL-BR150, manufacture by Ube Industries, Ltd.)
(Note 3) Antioxidant: ANTAGE AS (a reaction product between amine and ketone)
(Note 4) Vulcanization accelerator: NOCCELER CZ(N-cyclohexyl-2-benzothiazole sulfenamide)

EXAMPLES 6-1 to 5-5 AND COMPARATIVE EXAMPLES 6-1 to 6-5

By using each of the foregoing sample 1 and sample 2, compounding agents other than a vulcanization accelerator and sulfur in a compounding preparation as shown in Table 7 were kneaded by using a 1.7-L Banbury mixer for testing, thereby obtaining a kneaded material which is a high-hardness compounded rubber composition. On this occasion, a maximum kneading temperature was adjusted at 170 to 180° C. Next, this kneaded material was kneaded with a vulcanization accelerator and sulfur on a 10-inch roll, and the mixture was rolled in a sheet form and then charged in a die for vulcanization, thereby obtaining a vulcanizate. The vulcanization was carried out at 150° C. for 30 minutes. The results are summarized and shown in Table 7.

The compositions of the Examples are greatly improved with respect to the elastic modulus and highly balanced between the die swell and the exothermic characteristic. On the other hand, in the compositions of the Comparative Examples, when the commercially available BR is used, the die swell is large; and when the compounding amount of carbon black is high, the exothermic characteristic is deteriorated. Furthermore, when vinyl-cis-polybutadiene which is not satisfied in the invention is used or the amount of use of vinyl-cis-polybutadiene of the invention is low, the improvement effects did not reached the expected levels.

TABLE 7

| Compounding table | Example | | | | | Comparative Example | | | | |
|---|---|---|---|---|---|---|---|---|---|---|
| | 6-1 | 6-2 | 6-3 | 6-4 | 6-5 | 6-1 | 6-2 | 6-3 | 6-4 | 6-5 |
| Kind of vinyl-cis-poly-butadiene | Sample 1 | Sample 1 | Sample 1 | Sample 1 | Sample 1 | — | Sample 2 | Sample 1 | Sample 1 | Sample 1 |
| Amount (parts) | 50 | 70 | 30 | 50 | 50 | — | 50 | 50 | 50 | 10 |
| NR (Note 1) | 50 | 30 | 70 | 50 | 50 | 50 | 50 | 50 | 50 | 90 |
| BR (Note 2) | — | — | — | — | — | 50 | — | — | — | — |
| Carbon black N330 | 40 | 40 | 40 | 50 | 35 | 40 | 40 | 60 | 20 | 40 |
| Aromatic oil | 10 | 10 | 10 | 10 | 10 | 10 | 10 | 10 | 10 | 10 |
| Zinc oxide | 5 | 5 | 5 | 5 | 5 | 5 | 5 | 5 | 5 | 5 |
| Stearic acid | 2 | 2 | 2 | 2 | 2 | 2 | 2 | 2 | 2 | 2 |
| Antioxidant (Note 3) | 1 | 1 | 1 | 1 | 1 | 1 | 1 | 1 | 1 | 1 |
| Vulcanization accelerator (Note 4) | 1.0 | 0.9 | 0.8 | 1.0 | 1.0 | 1.0 | 1.0 | 1.0 | 1.0 | 0.7 |
| Sulfur | 1.5 | 1.7 | 2.0 | 1.5 | 1.5 | 1.5 | 1.5 | 1.5 | 1.5 | 2.2 |

TABLE 7-continued

| Compounding table | Example | | | | | Comparative Example | | | | |
|---|---|---|---|---|---|---|---|---|---|---|
| | 6-1 | 6-2 | 6-3 | 6-4 | 6-5 | 6-1 | 6-2 | 6-3 | 6-4 | 6-5 |
| Physical properties of compounded material: | | | | | | | | | | |
| Die swell index | 71 | 63 | 85 | 62 | 78 | 100 | 88 | 55 | 103 | 94 |
| Physical properties of vulcanizate: | | | | | | | | | | |
| 300% tensile elastic modulus (index) | 210 | 234 | 160 | 233 | 190 | 100 | 138 | 260 | 113 | 120 |
| Exothermic characteristic (index) | 83 | 79 | 88 | 96 | 75 | 100 | 106 | 110 | 87 | 99 |

(Note 1) NR: RSS#1
(Note 2) BR: Polybutadiene (UBEPOL-BR150, manufacture by Ube Industries, Ltd.)
(Note 3) Antioxidant: ANTAGE AS (a reaction product between amine and ketone)
(Note 4) Vulcanization accelerator: NOCCELER CZ (N-cyclohexyl-2-benzothiazole sulfenamide)

EXAMPLES 7-1 to 7-3 AND COMPARATIVE EXAMPLES 7-1 to 7-2

By using each of the foregoing sample 1 and sample 2, compounding agents other than a vulcanization accelerator and sulfur in a compounding preparation as shown in Table 8 were kneaded by using a 1.7-L Banbury mixer for testing, thereby obtaining a kneaded material which is a rubber composition for tire cord coating. On this occasion, a maximum kneading temperature was adjusted at 170 to 180° C. Next, this kneaded material was kneaded with a vulcanization accelerator and sulfur on a 10-inch roll, and the mixture was rolled in a sheet form and then charged in a die for vulcanization, thereby obtaining a vulcanizate. The vulcanization was carried out at 150° C. for 30 minutes. The results are summarized and shown in Table 8.

The compositions of the Examples have a small die swell, are largely improved with respect to the green modulus while keeping a high elastic modulus and are excellent in adhesiveness to metals. On the other hand, in the compositions of the Comparative Examples, since the vinyl-cis-polybutadiene which does not meet the characteristics of the invention is used or commercially available high cis-polybutadiene is used, the desired characteristics cannot be obtained.

TABLE 8

| Compounding table | Example | | | Comparative Example | |
|---|---|---|---|---|---|
| | 7-1 | 7-2 | 7-3 | 7-1 | 7-2 |
| kind of vinyl-cis-polybutadiene | Sample 1 | Sample 1 | Sample 1 | — | Sample 2 |
| Amount (parts) | 35 | 20 | 35 | — | 35 |
| NR (Note 1) | 65 | 80 | 65 | 65 | 65 |
| BR (Note 2) | — | — | — | 35 | — |
| Carbon black N330 | 60 | 60 | 50 | 60 | 60 |
| Zinc oxide | 7 | 7 | 7 | 7 | 7 |
| Stearic acid | 2 | 2 | 2 | 2 | 2 |
| Cobalt stearate | 3 | 3 | 3 | 3 | 3 |
| Antioxidant (Note 3) | 2 | 2 | 2 | 2 | 2 |
| Vulcanization accelerator (Note 4) | 0.8 | 0.8 | 0.8 | 0.8 | 0.8 |
| Sulfur | 1.5 | 1.5 | 1.5 | 1.5 | 1.5 |
| Physical properties of compounded material: | | | | | |
| Die swell (index) | 72 | 81 | 80 | 100 | 96 |
| 100% green modulus (index) | 136 | 124 | 113 | 100 | 105 |
| Physical properties of vulcanizate: | | | | | |
| 300% tensile elastic modulus (index) | 174 | 150 | 128 | 100 | 126 |
| Tensile strength (index) | 163 | 144 | 125 | 100 | 138 |
| Adhesive strength to metal (index) | 107 | 106 | 105 | 100 | 93 |

(Note 1) NR: RSS#1
(Note 2) BR: Polybutadiene (UBEPOL-BR150, manufacture by Ube Industries, Ltd.)
(Note 3) Antioxidant: ANTAGE AS (a reaction product between amine and ketone)
(Note 4) Vulcanization accelerator: NOCCELER CZ (N-cyclohexyl-2-benzothiazole sulfenamide)

INDUSTRIAL APPLICABILITY

The silica compounded rubber composition for tire which is used in the invention has a small die swell and excellent extrusion processability and moldability while keeping high wet skid properties, improves the workability of tire manufacture and has excellent abrasion resistance and low fuel consumption.

The rubber composition for sidewall of the invention has low fuel consumption with respective to a vulcanizate thereof and has a small die swell.

The rubber composition for passenger automobile tire according to the invention is able to realize a high elastic modulus and high abrasion resistance while keeping wet skid properties.

The rubber composition for large-sized vehicle tire according to the invention has a small die swell and excellent extrusion processability while keeping a high elastic modulus and is able to be highly balanced between wet skid properties and abrasion resistance.

The high-hardness compounded rubber composition according to the invention improves dimensional stability at the time of processing and durability of tire at the same time while keeping a high hardness and is able to make the both performances compatible with each in a good balance.

The rubber composition for base tread according to the invention improves die swell and low fuel consumption at the same time and is able to make the both performances compatible with each in a good balance.

The rubber composition for tire cord coating according to the invention has a small die swell, large green strength and excellent extrusion processability and moldability while keeping a high elastic modulus, has excellent adhesiveness to metals and is able to be highly balanced among the respective characteristics.

The invention claimed is:

1. A silica compounded rubber composition for a tire, the composition comprising 100 parts by weight of a rubber component including from 20 to 80% by weight of (a) and 80 to 20% by weight of (b), wherein (a) comprises a vinyl-cis-polybutadiene rubber composition containing 1,2-polybutadiene having a melting point of 170° C. or higher, a cis-polybutadiene rubber, and a first substance having at least one unsaturated double bond per repeating unit and comprising at least one member selected from the group consisting of polyisoprene, crystalline polybutadiene having a melting point of not higher than 150° C., liquid polybutadiene, and derivatives thereof, and wherein (b) comprises a diene-based rubber other than (a); and wherein the rubber composition further includes 40 to 100 parts by weight of (c), which comprises a rubber reinforcing agent containing 40% or more of silica, wherein the vinyl-cis-polybutadiene rubber composition (a) is produced by a process for producing a vinyl-cis-polybutadiene rubber composition by subjecting 1,3-butadiene to cis-1,4-polymerization in a hydrocarbon-based solvent by using a cis-1,4-polymerization catalyst to provide a resulting polymerization reaction mixture, subsequently making a 1,2-polymerization catalyst copresent in the resulting polymerization reaction mixture to subject 1,3-butadiene to 1,2-polymerization, thereby forming 1,2-polybutadiene having a melting point of 170° C. or higher, and then separating, recovering and obtaining the vinyl-cis-polybutadiene rubber composition as formed, wherein the process for producing the vinyl-cis-polybutadiene rubber composition comprises a step of adding the first substance during the production of the vinyl-cis-polybutadiene rubber, and wherein the 1,2-polybutadiene is in a short crystalline fiber form in which a minor axis average length of monodispersed fiber crystals is not more than 0.2 μm, an aspect ratio is not more than 10, and a number of average monodispersed fiber crystals is 10 or more per 400 μm$^2$.

2. The rubber composition according to claim 1, wherein in the production of the vinyl-cis-polybutadiene rubber composition (a), the first substance is added in a range of from 0.01 to 50% by mass based on a total sum of the crystalline fibers of 1,2-polybutadiene and the cis-polybutadiene rubber.

3. The rubber composition according to claim 1, wherein the 1,2-polybutadiene in short crystalline fiber form in the vinyl-cis-polybutadiene rubber composition (a) is (I) dispersed in the cis-polybutadiene rubber without being contained in particles of the first substance, wherein the cis-polybutadine rubber is a matrix for the 1,2-polybutadiene, and wherein a major axis length of the short crystalline fibers dispersed in the matrix is in a range of from 0.2 to 1,000 μm, or II) dispersed in the particles of the first substance, wherein the major axis length of the short crystalline fibers dispersed in the particles of the first substance is in a range of from 0.01 to 0.5 μm.

4. The rubber composition according to claim 1, wherein the vinyl-cis-polybutadiene rubber composition (a) has the following characteristics:
(1) the cis-polybutadiene rubber is a matrix component of the vinyl-cis-polybutadiene rubber composition and has a Mooney viscosity in a range of from 10 to 50;
(2) the cis-polybutadiene rubber has a viscosity in a toluene solution at 25° C. in a range of from 10 to 150 centipoises;
(3) the cis-polybutadiene rubber is the matrix component of said vinyl-cis-polybutadiene rubber composition and has an [η] in the range of from 1.0 to 5.0;
(4) the cis-polybutadiene rubber has a 1,4-cis-structure content in a range of 80% or more;
(5) the 1,2-polybutadiene and the first substance are dispersed in a physically and/or chemically adsorbed state in the cis-polybutadiene rubber which is the matrix component of the vinyl-cis-polybutadiene rubber composition; and
(6) the high-molecular substance in the vinyl-cis-polybutadiene rubber composition is a boiling n-hexane insoluble matter.

5. The rubber composition according to claim 1, wherein the diene-based rubber (b) other than (a) is a natural rubber and/or polyisoprene and/or a styrene-butadiene rubber.

6. A rubber composition for a tire sidewall, the composition comprising 100 parts by weight of a rubber component including from 20 to 80% by weight of (a) and 80 to 20% by weight of (b), wherein (a) comprises a vinyl-cis-polybutadiene rubber composition containing 1,2-polybutadiene having a melting point of 170° C. or higher, a cis-polybutadiene rubber, and a first substance having at least one unsaturated double bond per repeating unit and comprising at least one member selected from the group consisting of polyisoprene, crystalline polybutadiene having a melting point of not higher than 150° C., liquid polybutadiene, and derivatives thereof, and wherein (b) comprises a diene-based rubber other than (a); and wherein the rubber composition further includes 25 to 60 parts by weight of (c), which comprises a rubber reinforcing agent, wherein the vinyl-cis-polybutadiene rubber composition (a) is produced by a process for producing a vinyl-cis-polybutadiene rubber composition by subjecting 1,3-butadiene to cis-1,4-polymerization in a hydrocarbon-based solvent by using a cis-1,4-polymerization catalyst to provide a resulting polymerization reaction mixture, subsequently making a 1,2-polymerization catalyst copresent in the resulting polymerization reaction mixture to subject 1,3-butadiene to 1,2-polymerization, thereby forming 1,2-polybutadiene having a melting point of 170° C. or higher, and then separating, recovering and obtaining the vinyl-cis-polybutadiene rubber composition as formed, wherein the process for producing the vinyl-cis-polybutadiene comprises a step of adding the first substance during the production of the vinyl-cis-polybutadiene rubber, and wherein the 1,2-polybutadiene is in a short crystalline fiber form in which a minor axis average length of monodispersed fiber crystals is not more than 0.2 μm, an aspect ratio is not more than 10, and a number of average monodispersed fiber crystals is 10 or more per 400 μm$^2$.

7. The rubber composition according to claim 6, wherein the diene-based rubber (b) other than (a) is a natural rubber and/or polyisoprene.

8. The rubber composition according to claim 6, wherein the rubber reinforcing agent is carbon black.

9. A rubber composition for a passenger automobile tire, the composition comprising 100 parts by weight of a rubber component including from 10 to 50% by weight of (a), 0 to 60% by weight of (b), and 30 to 70% by weight of (e), wherein (a) comprises a vinyl-cis-polybutadiene rubber composition containing 1,2-polybutadiene having a melting point of 170° C. or higher, a cis-polybutadiene rubber, and a first substance having at least one unsaturated double bond per repeating unit and comprising at least one member selected from the group consisting of polyisoprene, crystalline polybutadiene having a melting point of not higher than 150° C., liquid polybutadiene, and derivatives thereof, and wherein (e) comprises a styrene-butadiene rubber and (b) comprises a diene-based rubber other than (a) and (e); and wherein the rubber composition further comprises 40 to 100 parts by weight of (d), which comprises a rubber reinforcing agent, wherein the vinyl-cis-polybutadiene rubber composition (a) is produced by a process for producing a vinyl-cis-polybutadiene rubber composition by subjecting 1,3-butadiene to cis-1,4-polymerization in a hydrocarbon-based solvent by using a cis-1,4-polymerization catalyst to provide a resulting polymerization reaction mixture, subsequently making a 1,2-polymerization catalyst copresent in the resulting polymerization reaction mixture to subject 1,3-butadiene to 1,2-polymerization, thereby forming 1,2-polybutadiene having a melting point of 170° C. or higher, and then separating, recovering and obtaining the vinyl-cis-polybutadiene rubber composition as formed, wherein the process for producing the vinyl-cis-polybutadiene rubber composition comprises a step for adding the first substance during the production of the vinyl-cis-polybutadiene rubber, and wherein the 1,2-polybutadiene is in a short crystalline fiber form in which a minor axis average length of monodispersed fiber crystals is not more than 0.2 μm, an aspect ratio is not more than 10, and a number of average monodispersed fiber crystals is 10 or more per 400 μm$^2$.

10. A rubber composition for a large-sized vehicle tire, the composition comprising 100 parts by weight of a rubber component including from 10 to 60% by weight of (a) and 90 to 40% by weight of (b), wherein (a) comprises a vinyl-cis-polybutadiene rubber composition containing 1,2-polybutadiene having a melting point of 170° C. or higher, a cis-polybutadiene rubber, and a first substance having at least one unsaturated double bond per repeating unit and comprising at least one member selected from the group consisting of polyisoprene, crystalline polybutadiene having a melting point of not higher than 150° C., liquid polybutadiene, and derivatives thereof, and wherein (b) comprises a diene-based rubber other than (a); and wherein the rubber composition further includes 45 to 70 parts by weight of (c), which comprises a rubber reinforcing agent, wherein the vinyl-cis-polybutadiene rubber composition (a) is produced by a process for producing a vinyl-cis-polybutadiene rubber composition by subjecting 1,3-butadiene to cis-1,4-polymerization in a hydrocarbon-based solvent by using a cis-1,4-polymerization catalyst to provide a resulting polymerization reaction mixture, subsequently making a 1,2-polymerization catalyst copresent in the resulting polymerization reaction mixture to subject 1,3-butadiene to 1,2-polymerization, thereby forming 1,2-polybutadiene having a melting point of 170° C. or higher, and then separating, recovering and obtaining the vinyl-cis-polybutadiene rubber composition as formed, wherein the process for producing the vinyl-cis-polybutadiene rubber comprises a step of adding the first substance during the production of the vinyl-cis-polybutadiene rubber, and wherein the 1,2-polybutadiene is in a short crystalline fiber form in which a minor axis average length of monodispersed fiber crystals is not more than 0.2 μm, an aspect ratio is not more than 10, and a number of average monodispersed fiber crystals is 10 or more per 400 μm$^2$.

11. A high-hardness compounded rubber composition, comprising 100 parts by weight of a rubber component including from 20 to 80% by weight of (a) and 80 to 20% by weight of (b), wherein (a) comprises a vinyl-cis-polybutadiene rubber composition containing 1,2-polybutadiene having a melting point of 170μ C. or higher, a cis-polybutadiene rubber, and a first substance having at least one unsaturated double bond per repeating unit and comprising at least one member selected from the group consisting of polyisoprene, crystalline polybutadiene having a melting point of not higher than 150° C., liquid polybutadiene, and derivatives thereof, and wherein (b) comprises a diene-based rubber other than (a); and wherein the rubber composition further includes 60 to 100 parts by weight of (c), which comprises a rubber reinforcing agent, wherein the vinyl-cis-polybutadiene rubber composition (a) is produced by a process for producing a vinyl-cis-polybutadiene rubber composition by subjecting 1,3-butadiene to cis-1,4-polymerization in a hydrocarbon-based solvent by using a cis-1,4-polymerization catalyst, to provide a resulting polymerization reaction mixture, subsequently making a 1,2-polymerization catalyst copresent in the resulting polymerization reaction mixture to subject 1,3-butadiene to 1,2-polymerization, thereby forming 1,2-polybutadiene having a melting point of 170° C. or higher, and then separating, recovering and obtaining the vinyl-cis-polybutadiene rubber composition as formed, wherein the process for producing the vinyl-cis-polybutadiene rubber comprises a step for adding the first substance during the production of the vinyl-cis-polybutadiene rubber, and wherein the 1,2-polybutadiene is in a short crystalline fiber form in which a minor axis average length of monodispersed fiber crystals is not more than 0.2 μm, an aspect ratio is not more than 10, and a number of average monodispersed fiber crystals is 10 or more per 400 μm$^2$.

12. A rubber composition for a tire base tread, the composition comprising 100 parts by weight of a rubber component including from 20 to 80% by weight of (a) and 80 to 20% by weight of (b), wherein (a) comprises a vinyl-cis-polybutadiene rubber composition containing 1,2-polybutadiene having a melting point of 170° C. or higher, a cis-polybutadiene rubber, and a first substance having at least one unsaturated double bond per repeating unit and comprising at least one member selected from the group consisting of polyisoprene, crystalline polybutadiene having a melting point of not higher than 150° C., liquid polybutadiene, and derivatives thereof, and wherein (b) comprises a diene-based rubber other than (a); and wherein the rubber composition further includes 22 to 55 parts by weight of (c), which comprises a rubber reinforcing agent, wherein the vinyl-cis-polybutadiene rubber composition (a) is produced by a process for producing a vinyl-cis-polybutadiene rubber composition by subjecting 1,3-butadiene to cis-1,4-polymerization in a hydrocarbon-based solvent by using a cis-1,4-polymerization catalyst to provide a resulting polymerization reaction mixture, subsequently making a 1,2-polymerization catalyst copresent in the resulting polymerization reaction mixture to subject 1,3-butadiene to 1,2-polymerization, thereby forming 1,2-polybutadiene having a melting point of 170° C. or higher, and then separating, recovering and obtaining the vinyl-cis-polybutadiene rubber composition as formed from the resulting polymerization reaction mixture, wherein the process for producing the vinyl-cis-polybutadiene rubber comprises a step of adding the first substance during the production of the vinyl-cis-polybutadiene rubber, and wherein the 1,2-polybutadiene is in a short crystalline fiber form in which a minor axis average length of monodispersed fiber crystals is not more than 0.2 μm, an aspect ratio is not more than 10, and a number of average monodispersed fiber crystals is 10 or more per 400 μm$^2$.

13. A rubber composition for a tire cord coating, the composition comprising 100 parts by weight of a rubber component including from 10 to 60% by weight of (a) and 90 to 40% by weight of (b), wherein (a) comprises a vinyl-cis-polybutadiene rubber composition containing 1,2-polybutadiene having a melting point of 170° C. or higher, a cis-polybutadiene rubber, and a first substance having at least one unsaturated double bond per repeating unit and comprising at least one member selected from the group consisting of polyisoprene, crystalline polybutadiene having a melting point of not higher than 150° C., liquid polybutadiene, and derivatives thereof, and wherein (b) comprises a diene-based rubber other than (a); and wherein the rubber composition further includes 30 to 80 parts by weight of (c), which comprises a rubber reinforcing agent, wherein the vinyl-cis-polybutadiene rubber composition (a) is produced by a process for producing a vinyl-cis-polybutadiene rubber composition by subjecting 1,3-butadiene to cis-1,4-polymerization in a hydrocarbon-based solvent by using a cis-1,4-polymerization catalyst to provide a resulting polymerization reaction mixture, subsequently making a 1,2-polymerization catalyst copresent in the resulting polymerization reaction mixture to subject 1,3-butadiene to 1,2-polymerization, thereby forming 1,2-polybutadiene having a melting point of 170° C. or higher, and then separating, recovering and obtaining the vinyl-cis-polybutadiene rubber composition as formed from the resulting polymerization reaction mixture, wherein the process for producing the vinyl-cis-polybutadiene rubber comprises a step of adding the first substance during the production of the vinyl-cis-polybutadiene rubber, and wherein the 1,2-polybutadiene is in a short crystalline fiber form in which a minor axis average length of monodispersed fiber crystals is not more than 0.2 μm, an aspect ratio is not more than 10, and a number of average monodispersed fiber crystals is 10 or more per 400 μm$^2$.

\* \* \* \* \*